United States Patent
Zhamu et al.

(10) Patent No.: US 10,084,220 B2
(45) Date of Patent: Sep. 25, 2018

(54) HYBRID SOLID STATE ELECTROLYTE FOR LITHIUM SECONDARY BATTERY

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 10 days.

(21) Appl. No.: 15/375,508

(22) Filed: Dec. 12, 2016

(65) Prior Publication Data
US 2018/0166759 A1 Jun. 14, 2018

(51) Int. Cl.
| | |
|---|---|
| *H01M 10/056* | (2010.01) |
| *H01M 12/06* | (2006.01) |
| *H01M 10/0525* | (2010.01) |
| *H01M 10/0565* | (2010.01) |
| *H01M 10/058* | (2010.01) |
| *H01M 12/02* | (2006.01) |

(52) U.S. Cl.
CPC .......... *H01M 12/06* (2013.01); *H01M 10/058* (2013.01); *H01M 10/0525* (2013.01); *H01M 10/0565* (2013.01); *H01M 12/02* (2013.01); *H01M 2300/0082* (2013.01)

(58) Field of Classification Search
CPC . H01M 2300/0065; H01M 2300/0082; H01M 2300/0091; H01M 10/056
See application file for complete search history.

(56) References Cited

U.S. PATENT DOCUMENTS

| | | |
|---|---|---|
| 4,880,508 A | 11/1989 | Aldissi et al. |
| 2014/0226201 A1 | 8/2014 | Posset et al. |

(Continued)

FOREIGN PATENT DOCUMENTS

| | | |
|---|---|---|
| WO | 2003100884 A2 | 12/2003 |
| WO | 2016187448 A1 | 11/2016 |

OTHER PUBLICATIONS

PCT/US2017/065707 International Search Report and Written Opinion dated Feb. 14, 2018, 10 pages.

*Primary Examiner* — Stewart A Fraser

(57) ABSTRACT

Provided is a solid state electrolyte for a rechargeable lithium battery, comprising a lithium ion-conducting polymer matrix or binder and a lithium ion-conducting inorganic species dispersed in or chemically bonded by the polymer matrix or binder, wherein the lithium ion-conducting inorganic species is selected from a mixture of a sodium-conducting species or sodium salt and a lithium-conducting species or lithium salt selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4; and wherein the polymer matrix or binder is in an amount from 1% to 99% by volume of the electrolyte composition. Also provided are a process for producing this solid state electrolyte and a lithium secondary battery containing such a solid state electrolyte.

31 Claims, 9 Drawing Sheets

(56) References Cited

U.S. PATENT DOCUMENTS

| | | |
|---|---|---|
| 2014/0363746 A1 | 12/2014 | He et al. |
| 2015/0024121 A1 | 1/2015 | He et al. |
| 2015/0064574 A1 | 3/2015 | He et al. |
| 2015/0064575 A1 | 3/2015 | He et al. |
| 2015/0288027 A1* | 10/2015 | Lee .................... H01M 10/052 429/317 |

* cited by examiner

HYBRID SOLID STATE ELECTROLYTE FOR LITHIUM SECONDARY BATTERY

FIELD OF THE INVENTION

The present invention provides a hybrid solid state electrolyte for a lithium-ion battery or a rechargeable lithium metal battery (having lithium metal as the anode active material).

BACKGROUND

Rechargeable lithium-ion (Li-ion), lithium metal, lithium-sulfur, and Li metal-air batteries, as shown in FIG. 1, are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries.

Even now, cycling stability and safety concerns remain the primary factors preventing the further commercialization of Li metal batteries (e.g. Lithium-sulfur and Lithium-transition metal oxide cells) for EV, HEV, and microelectronic device applications. Again, cycling stability and safety issues of lithium metal rechargeable batteries are primarily related to the high tendency for Li metal to form dendrite structures during repeated charge-discharge cycles or overcharges, leading to internal electrical shorting and thermal runaway. This thermal runaway or even explosion is caused by the organic liquid solvents used in the electrolyte (e.g. carbonate and ether families of solvents), which are unfortunately highly volatile and flammable.

Many attempts have been made to address the dendrite and thermal runaway issues. However, despite these earlier efforts, no rechargeable Li metal batteries have succeeded in the market place. This is likely due to the notion that these prior art approaches still have major deficiencies. For instance, in several cases, the anode or electrolyte structures designed for prevention of dendrites are too complex. In others, the materials are too costly or the processes for making these materials are too laborious or difficult. In most of the lithium metal cells and lithium-ion cells, the electrolyte solvents are flammable. An urgent need exists for a simpler, more cost-effective, and easier to implement approach to preventing Li metal dendrite-induced internal short circuit and thermal runaway problems in Li metal batteries and other rechargeable lithium batteries.

Parallel to these efforts and prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost, safety, and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-170 mAh/g. As a result, the specific energy of commercially available Li-ion cells is typically in the range of 120-220 Wh/kg, most typically 150-180 Wh/kg. These specific energy values are two to three times lower than what would be required for battery-powered electric vehicles to be widely accepted.

Furthermore, the same flammable solvents previously used for lithium metal secondary batteries are also used in most of the lithium-ion batteries. Despite the notion that there is significantly reduced propensity of forming dendrites in a lithium-ion cell (relative to a lithium metal cell), the lithium-ion cell has its own intrinsic safety issue. For instance, the transition metal elements in the lithium metal oxide cathode are highly active catalysts that can promote and accelerate the decomposition of organic solvents, causing thermal runaway or explosion initiation to occur at a relatively low electrolyte temperature (e.g. <200° C., as opposed to normally 400° C. without the catalytic effect).

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

With the rapid development of hybrid (HEV), plug-in hybrid electric vehicles (HEV), and all-battery electric vehicles (EV), there is an urgent need for anode and cathode materials and electrolytes that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li°$. This electrochemical potential is approximately ⅔ of that exhibited by conventional positive electrodes. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Values can approach 2,500 Wh/kg or 2,800 Wh/l based on the combined Li and S weight or volume (not based on the total cell weight or volume), respectively, assuming complete reaction to $Li_2S$. With a proper cell design, a cell-level specific energy of 1,200 Wh/kg (of cell weight) and cell-level energy density of 1,400 Wh/l (of cell volume) should be achievable. However, the current Li-sulfur experimental cells of industry leaders in sulfur cathode technology have a maximum cell specific energy of 250-400 Wh/kg (based on the total cell weight), far less than what could be obtained in real practice.

In summary, despite its considerable advantages, the rechargeable lithium metal cell in general and the Li—S cell and the Li-air cell in particular are plagued with several major technical problems that have hindered its widespread commercialization:

(1) Conventional lithium metal secondary cells (e.g., rechargeable Li metal cells, Li—S cells, and Li-Air cells) still have dendrite formation and related internal shorting and thermal runaway issues. Also, conventional Li-ion cells still make use of significant amounts of flammable liquids (e.g. propylene carbonate, ethylene carbonate, 1,3-dioxolane, etc.) as the primary electrolyte solvent, risking danger of explosion;

(2) The Li—S cell tends to exhibit significant capacity degradation during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator and electrolyte to the Li negative electrode whereupon they are reduced to solid precipitates ($Li_2S_2$ and/or $Li_2S$), causing active mass loss. In addition, the solid product that precipitates on the surface of the positive electrode during discharge can become electrochemically irreversible, which also contributes to active mass loss.

(3) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications. Despite the various approaches proposed for the fabrication of high energy density rechargeable cells containing elemental sulfur, organo-sulfur and carbon-sulfur cathode materials, or derivatives and combinations thereof, there remains a need for materials and cell designs that (a) retard the out-diffusion of anionic reduction products, from the cathode compartments into other components in these cells, (b) improve the battery safety, and (c) provide rechargeable cells with high capacities over a large number of cycles.

Although solid electrolytes are effective in addressing the lithium metal dendrite and flammability issues, conventional solid-state electrolytes have the following major deficiencies: low lithium ion conductivities (typically $<<10^{-4}$ S/cm, and mostly $<<10^{-5}$ S/cm), difficulty in making solid-state electrolyte (high temperature sintering typically required) and implementing it in a battery cell, extreme brittleness, no flexibility (hence, not being compliant and being in poor ionic contact with the anode and/or cathode and, hence, poor active material utilization efficiency), and high costs.

Hence, a general object of the present invention is to provide an electrolyte system for a rechargeable lithium cell that exhibits a high energy density, high power density, long cycle life, and no danger of explosion due to the use of a safer, non-flammable, solid state electrolyte. This solid state electrolyte overcomes the aforementioned deficiencies.

The invention also provides a rechargeable lithium cell containing such a safe electrolyte system. This lithium cell includes the lithium metal secondary cell (e.g. Li—S, Li—$TiS_2$, Li—Se, Li—$MoS_2$, Li—$VO_2$, and Li-air, just to name a few), lithium-ion cell (e.g. graphite-$LiMn_2O_4$, Si—$Li_xNi_yMn_zO_2$, etc.), Li-ion sulfur cell (e.g. prelithiated Si—S cell), and hybrid lithium cell (wherein at least one electrode operates on lithium insertion or intercalation).

A specific object of the present invention is to provide a rechargeable Li—S battery that exhibits an exceptionally high specific energy or high energy density and a high level of safety. One specific technical goal of the present invention is to provide a safe Li metal-sulfur or Li ion-sulfur cell having a long cycle life and a cell specific energy greater than 400 Wh/Kg, preferably greater than 500 Wh/Kg, and more preferably greater than 600 Wh/Kg (all based on the total cell weight).

Another specific object of the present invention is to provide a safe lithium-sulfur cell that exhibits a high specific capacity (higher than 1,200 mAh/g based on the sulfur weight, or higher than 1,000 mAh/g based on the cathode composite weight, including sulfur, conducting additive and conductive substrate, and binder weights combined, but excluding the weight of cathode current collector). The specific capacity is preferably higher than 1,400 mAh/g based on the sulfur weight alone or higher than 1,200 mAh/g based on the cathode composite weight. This must be accompanied by a high specific energy, good resistance to dendrite formation, good resistance to thermal runaway, no possibility of an explosion, and a long and stable cycle life.

It may be noted that in most of the open literature reports (scientific papers) on Li—S cells, scientists choose to express the cathode specific capacity based on the sulfur weight or lithium polysulfide weight alone (not on the total cathode composite weight), but unfortunately a large proportion of non-active materials (those not capable of storing lithium, such as conductive additive and binder) is typically used in their Li—S cells. Similarly, for lithium-vanadium oxide cells, scientists also tend to report the cathode specific capacity based on the vanadium oxide weight only. For practical usage purposes, it is more meaningful to use the cathode composite weight-based capacity value.

A specific object of the present invention is to provide a rechargeable lithium-sulfur cell based on rational materials and battery designs that overcome or significantly reduce the following issues commonly associated with conventional Li—S cells: (a) dendrite formation (internal shorting); (b) extremely low electric and ionic conductivities of sulfur, requiring large proportion (typically 30-55%) of non-active conductive fillers and having significant proportion of non-accessible or non-reachable sulfur or lithium polysulfides); (c) dissolution of lithium polysulfide in electrolyte and migration of dissolved lithium polysulfides from the cathode to the anode (which irreversibly react with lithium at the anode), resulting in active material loss and capacity decay (the shuttle effect); and (d) short cycle life.

A very important object of the present invention is to provide a simple, cost-effective, and easy-to-implement approach to preventing potential Li metal dendrite-induced internal short circuit and thermal runaway problems in various Li metal and Li-ion batteries.

SUMMARY OF THE INVENTION

The present invention provides a hybrid solid state electrolyte composition for a rechargeable lithium battery. This hybrid electrolyte composition comprises a mixture of three chemical species: (a) a lithium ion-conducting polymer matrix or binder, (b) a lithium ion-conducting inorganic species or lithium salt, and (c) a sodium ion-conducting species or sodium salt, wherein the lithium ion-conducting inorganic species or lithium salt and the sodium ion-conducting species or sodium salt are dispersed in or chemically bonded by the polymer matrix or binder. The lithium ion-conducting inorganic species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4, and wherein the polymer matrix or binder is in an amount from 1% to 99% by weight of the electrolyte composition (preferably from 5% to 95% and more preferably from 20% to 80%) and a weight ratio between said lithium ion-conducting inorganic species or lithium salt and said sodium ion-conducting species or sodium salt is from 1/99 to 99/1 (preferably from 25/75 to 75/25).

In this hybrid solid state electrolyte composition, the sodium-conducting species or sodium salt is selected from $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, $NaClO_4$, $NaPF_6$, $NaF_4$, $NaAsF_6$, $NaCF_3SO_3$, NaN $(CF_3SO_2)_2$, sodium bis(oxalato)borate, NaBOB, $NaBF_2C_2O_4$, $NaBF_2C_2O_4$, $NaNO_3$, $NaPF_3(CF_2CF_3)_3$, sodium bisperfluoro-ethylsulfonylimide, NaBETI, sodium bis(trifluoromethanesulphonyl)imide, sodium bis(fluorosulphonyl)imide, sodium trifluoromethanesulfonimide, NaTFSI, an ionic liquid-based sodium salt, or a combination thereof; wherein X=F, Cl, I, or Br, R=a hydrocarbon group, x=0-1, y=1-4.

We have surprisingly observed that the presence of a sodium-conducting species or sodium salt can significantly increase the lithium-ion conductivity of a lithium-based solid state electrolyte containing a lithium ion-conducting inorganic species or lithium salt dispersed in an ion-conducting polymer (e.g. sulfonated polymer, in particular). This synergistic effect is truly unexpected.

The invention also provides a lithium secondary battery containing an anode, a cathode, and the presently invented hybrid solid state electrolyte. The lithium secondary battery can be a lithium-ion battery, a rechargeable lithium metal battery, a lithium-sulfur battery, a lithium-selenium battery, or a lithium-air battery.

In certain embodiments, the polymer matrix or binder comprises a sulfonated polymer, a mixture of a sulfonated polymer and an electron-conducting polymer (intended primarily for use in the cathode side where the cathode active materials are typically low in electronic conductivity), a mixture of a sulfonated polymer and an electronically non-conducting polymer, or a mixture of an electron-conducting polymer and a lithium ion-conducting polymer. In an embodiment, the polymer matrix or binder is selected from sulfonated polyaniline, sulfonated polypyrrole, sulfonated polythiophene, sulfonated polyfuran, or a combination thereof.

The sulfonated polymer may be selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidene fluoride, sulfonated copolymers of polyvinylidene fluoride with hexafluoropropene and tetrafluoroethylene, sulfonated copolymers of ethylene and tetrafluoroethylene, polybenzimidazole, and chemical derivatives, copolymers, and blends thereof.

In certain embodiments, the polymer matrix or binder comprises a mixture of an electron-conducting polymer and a lithium ion-conducting polymer, wherein the lithium ion-conducting polymer is selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly (ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof, wherein the electron-conducting polymer-to-lithium ion-conducting polymer weight ratio is from 1/99 to 99/1. The electron-conducting polymer is selected from the group consisting of polyaniline, polypyrrole, polythiophene, polyfuran, bi-cyclic polymers, derivatives thereof, and combinations thereof.

In certain embodiments, the polymer matrix or binder contains a lithium ion-conducting polymer selected from poly(ethylene oxide) (PEO), Polypropylene oxide, poly(acrylonitrile) (PAN), poly(methyl methacrylate) (PMMA), poly(vinylidene fluoride) (PVDF), Poly bis-methoxy ethoxyethoxide-phosphazenex, Polyvinyl chloride, Polydimethylsiloxane, and poly(vinylidene fluoride)-hexafluoropropylene (PVDF-HFP), a derivative thereof, or a combination thereof.

The present invention also provides an alternative solid state electrolyte composition for a rechargeable lithium battery. This electrolyte composition comprises a lithium ion-conducting polymer matrix or binder selected from a sulfonated polymer, a lithium ion-conducting inorganic species or lithium salt, and a sodium ion-conducting species or sodium salt, wherein the lithium ion-conducting inorganic species or lithium salt and the sodium ion-conducting species or sodium salt are dispersed in or chemically bonded by the polymer matrix or binder. The lithium ion-conducting inorganic species is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof. The polymer matrix or binder is in an amount from 1% to 99% by weight of the electrolyte composition (preferably from 5% to 95% and more preferably from 20% to 80%) and a weight ratio between the lithium ion-conducting inorganic species or lithium salt and the sodium ion-conducting species or sodium salt is from 1/99 to 99/1

In this hybrid solid state electrolyte composition, the sodium ion-conducting species or sodium salt is selected from $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, $NaClO_4$, $NaPF_6$, $NaF_4$, $NaAsF_6$, $NaCF_3SO_3$, NaN$(CF_3SO_2)_2$, sodium bis(oxalato)borate, NaBOB, $NaBF_2C_2O_4$, $NaBF_2C_2O_4$, $NaNO_3$, $NaPF_3(CF_2CF_3)_3$, sodium bisperfluoro-ethysulfonylimide, NaBETI, sodium bis(trifluoromethanesulphonyl)imide, sodium bis(fluorosulphonyl)imide, sodium trifluoromethanesulfonimide, NaTFSI, an ionic liquid-based sodium salt, or a combination thereof; wherein X=F, Cl, I, or Br, R=a hydrocarbon group, x=0-1, y=1-4.

In this embodiment, the sulfonated polymer is preferably selected from sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, poly(perfluoro sulfonic acid), sulfonated copolymers of ethylene and tetrafluoroethylene, polybenzimidazole, and chemical derivatives, copolymers, and blends thereof.

The lithium ion-conducting polymer matrix may further contain particles of a filler dispersed therein. The filler may be selected from a metal oxide, metal carbide, metal nitride, metal boride, metal dichalcogenide, or a combination thereof. Preferably, the filler is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

The filler may be selected from nano discs, nano platelets, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. The filler, if present, contains defects to promote migration of lithium or sodium ions. Preferably the filler is from 1% to 30% by volume.

Preferably and typically, the lithium ion-conducting inorganic species has a room temperature ion conductivity no less than $10^{-4}$ S/cm, more preferably and typically no less than $10^{-3}$ S/cm.

It may be noted that lithium ion-conducting species (e.g. $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, and $Li_xSO_y$) are available from commercial sources, these species, individually or separately, can be readily prepared electrochemically (e.g. preferably in the presence of a lithium ion-conducting polymer).

Also provided is an alternative solid state electrolyte composition for a rechargeable lithium battery. This electrolyte composition comprises a lithium ion-conducting polymer matrix or binder selected from a sulfonated polymer and a lithium ion-conducting inorganic species that is dispersed in or chemically bonded by the polymer matrix or binder. The lithium ion-conducting inorganic species contains a lithium salt that is commonly used in a liquid electrolyte for lithium-ion batteries. However, no liquid solvent is utilized herein to make an electrolyte; instead, a sulfonated polymer is used. The lithium salt is preferably selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof; and wherein the polymer matrix or binder is in an amount from 1% to 99% by volume of the electrolyte composition (preferably from 5% to 95% and more preferably from 20% to 80%).

In this alternative embodiment, the sulfonated polymer is preferably selected from sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, poly(perfluoro sulfonic acid), sulfonated copolymers of ethylene and tetrafluoroethylene, polybenzimidazole, and chemical derivatives, copolymers, and blends thereof.

The present invention also provides a unique process for producing the solid state electrolyte composition that contains the lithium-containing inorganic species (i.e. $Li_2CO_3$, $Li_2O$, $Li_2C_2O_4$, LiOH, LiX, $ROCO_2Li$, $HCOLi$, $ROLi$, $(ROCO_2Li)_2$, $(CH_2OCO_2Li)_2$, $Li_2S$, and $Li_xSO_y$). These inorganic species are produced by electrochemical decomposition of the conventional liquid electrolytes (lithium salt+organic solvent) on an electrochemical electrode. In some preferred embodiments, the process comprises (a) preparing a working electrode containing a conductive material (e.g. a lithium ion-conducting polymer and/or a carbon materials such as an amorphous carbon or polymeric carbon matrix); (b) preparing a counter electrode containing lithium metal or alloy; (c) bringing the working electrode and the counter electrode in contact with an electrolyte containing a solvent and a lithium salt dissolved in the solvent; and (d) applying a current or voltage to the working electrode and the counter electrode to induce an electrochemical oxidative decomposition and/or a reductive decomposition of the electrolyte and/or the salt for forming the lithium-containing inorganic species to produce lithium ion-conducting inorganic species ($Li_2CO_3$, $Li_2O$, $Li_2C_2O_4$, LiOH, LiX, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4) that are chemically bonded to conductive material surfaces. The process can further contain combining the lithium ion-conducting inorganic species (with or without the carbon material) with a lithium ion-conducting polymer to form the solid state electrolyte composition.

In this process, there is a broad array of lithium salts and solvents to choose from to provide, or electrochemically produce therefrom, a wide variety of lithium-conducting species or mixtures. For instance, the lithium salt may be selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoroethysulfonylimide, LiBETI, lithium bis(trifluoro methanesulphonyl)imide, lithium bis(fluorosulphonyl) imide, lithium trifluoro methanesulfonimide, LiTFSI, an ionic liquid-based lithium salt, or a combination thereof. The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof.

Preferably, the process is a roll-to-roll process that includes preparing the working electrode in a roll form supported by a feeder roller, and the step of bringing the working electrode and the counter electrode in contact with the electrolyte contains unwinding the working electrode from the feeder roller, and feeding the working electrode into the electrolyte.

Also provided is another process for producing the solid state electrolyte composition. The process comprises (a) preparing a working electrode containing a lithium ion-conducting polymer; (b) preparing a counter electrode containing lithium metal or alloy; (c) bringing the working electrode and the counter electrode in physical contact with each other and in contact with an electrolyte containing a solvent and a lithium salt or sodium salt dissolved in the solvent; wherein the working electrode and the counter electrode are brought to be at the same electrochemical potential level, inducing a chemical reaction between the lithium metal or alloy and the lithium ion-conducting polymer and inducing electrochemical decomposition of the electrolyte for forming the lithium-containing inorganic species that are attached or chemically bonded to the lithium ion-conducting polymer to form the solid state electrolyte composition.

Alternatively, the process comprises (a) preparing a working electrode containing a carbon material; (b) preparing a counter electrode containing lithium metal or alloy; (c) bringing the working electrode and the counter electrode in physical contact with each other and in contact with an electrolyte containing a solvent and a lithium salt dissolved in the solvent; wherein the working electrode and the counter electrode are brought to be at the same electrochemical potential level, inducing a chemical reaction between the lithium metal or alloy and the carbon material and inducing electrochemical decomposition of the electrolyte for forming the lithium-containing inorganic species on surfaces of the carbon material; and (d) mixing the lithium-containing inorganic species, with or without the carbon material, with a lithium ion-conducting polymer for forming the solid state electrolyte composition. The lithium-containing inorganic species may be removed or separated from the surfaces of the carbon material prior to mixing with a lithium ion-conducting polymer. The process is preferably conducted in a roll-to-roll manner. The carbon material may be selected from an amorphous carbon, polymeric carbon (carbonized resin), activated carbon, carbon black, graphite particles, graphene sheets, carbon nanotubes, carbon fibers, graphite fibers, carbon nano-fibers, or a combination thereof.

The invention also provides a process for producing the solid state electrolyte composition using a direct internal shorting method. The process comprises: (a) preparing a working electrode containing a conductive material (e.g. preferably an amorphous carbon or polymeric carbon matrix and an optional carbon or graphite reinforcement phase); (b) preparing a counter electrode containing lithium metal or alloy; and (c) bringing the working electrode and the counter electrode in physical contact with each other and in contact with an electrolyte containing a solvent and a lithium salt dissolved in the solvent; wherein the working electrode and the counter electrode are brought to be at the same electrochemical potential level, inducing a chemical reaction between the lithium metal or alloy and the conductive material and inducing electrochemical decomposition of the electrolyte for forming the desired lithium-containing species that are attached to the conductive material (e.g. bonded to the amorphous carbon or polymeric carbon matrix and/or the optional carbon or graphite reinforcement phase). The lithium-containing species are then removed or separated from the conductive material and then mixed with a lithium ion-conducting polymer to produce the solid electrolyte composition. Alternatively, the conductive material in the working electrode may contain a lithium ion-conducting polymer, allowing the lithium-containing species to deposit thereon.

The advantages and features of the present invention will become more transparent with the description of the following best mode practice and illustrative examples.

DETAILED DESCRIPTION OF PREFERRED EMBODIMENTS

Figure 1:
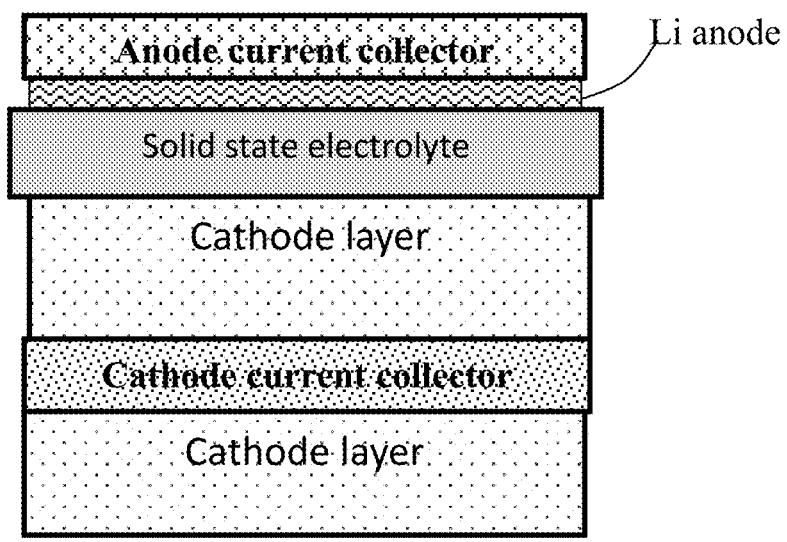
FIG. 1 Schematic of a rechargeable lithium metal battery.

The present invention provides a safe and high-performing hybrid solid state electrolyte for a rechargeable lithium battery, which can be any of various types of lithium-ion cells or lithium metal cells (e.g. Li-metal oxide, Li—S, Li-air, and Li—Se cells, etc.). A high degree of safety is imparted to this battery by a novel and unique hybrid solid-state electrolyte that is essentially non-flammable and would not initiate a fire and, hence, would not pose explosion danger. This invention has solved the very most critical issue that has plagued the lithium-metal and lithium-ion industries for more than three decades.

For illustration purpose, the following discussion of preferred embodiments is primarily based on Li—S cells (as an example), but the same or similar principles and procedures are applicable to all other rechargeable lithium metal batteries (using lithium metal or metal alloy as the anode active material). The cathode active materials can be, for instance, a transition metal oxide (e.g. $V_2O_5$) or sulfide (e.g. $MoS_2$), sulfur or polysulfide (e.g. lithium polysulfide), or just outside air (for a lithium-air). The solid state electrolyte can also be used in lithium-ion cells.

This hybrid solid state electrolyte composition comprises (a) a lithium ion-conducting polymer matrix or binder, (b) lithium ion-conducting inorganic species or lithium salt (also referred to as lithium-containing inorganic species), and (c) sodium ion-conducting species or sodium salt, wherein (b) and (c) are dispersed in or chemically bonded by the polymer matrix or binder. The lithium ion-conducting inorganic species is selected from $Li_2CO_3$, $Li_2O$, $Li_2C_2O_4$, LiOH, LiX, $ROCO_2Li$, $HCOLi$, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4. The polymer matrix or binder is in an amount from 1% to 99% by volume of the electrolyte composition.

In this hybrid solid state electrolyte composition, the sodium-conducting species or sodium salt is selected from $Na_2CO_3$, $Na_2O$, $Na_2C_2O_4$, NaOH, NaX, $ROCO_2Na$, HCONa, RONa, $(ROCO_2NO_2$, $(CH_2OCO_2NO_2$, $Na_2S$, $Na_xSO_y$, $NaClO_4$, $NaPF_6$, $NaF_4$, $NaAsF_6$, $NaCF_3SO_3$, $NaN(CF_3SO_2)_2$, sodium bis(oxalato)borate, NaBOB, $NaBF_2C_2O_4$, $NaBF_2C_2O_4$, $NaNO_3$, $NaPF_3(CF_2CF_3)_3$, sodium bisperfluoro-ethysulfonylimide, NaBETI, sodium bis(trifluoromethanesulphonyl)imide, sodium bis(fluorosulphonyl)imide, sodium trifluoromethanesulfonimide, NaTFSI, an ionic liquid-based sodium salt, or a combination thereof; wherein X=F, Cl, I, or Br, R=a hydrocarbon group, x=0-1, y=1-4.

The co-existence of a sodium-conducting species or sodium salt and a lithium ion-conducting species or lithium salt appears to exhibit significant synergistic effects as manifested by a surprisingly high lithium-ion conductivity of a hybrid solid state electrolyte containing both a lithium ion- and sodium ion-conducting inorganic species or salts dispersed in an ion-conducting polymer (e.g. sulfonated polymer).

We have surprisingly observed that a wide variety of sulfonated polymers are highly conducting to lithium ions, particularly when being used in combination with the aforementioned lithium ion-conducting inorganic species to form a composite solid electrolyte. The polymer matrix or binder may be selected from a sulfonated polymer itself, a mixture of a sulfonated polymer and an electron-conducting polymer (intended primarily for use in the cathode side), a mixture of a sulfonated polymer and an electronically non-conducting polymer, or a mixture of an electron-conducting polymer and a lithium ion-conducting polymer.

In an embodiment, the polymer matrix or binder is selected from sulfonated polyaniline, sulfonated polypyrrole, sulfonated polythiophene, sulfonated polyfuran, or a combination thereof. Such a polymer is not only lithium ion-conducting but also electron-conducting and, hence, cannot be used as the sole electrolyte without another layer of non-electron-conducting electrolyte or a porous separator layer. However, it is highly advantageous to implement such a polymer electrolyte in the cathode of a Li—S or Li—Se battery to reduce dissolution of sulfur, lithium polysulfide, selenium, or lithium selenide (for reduced or eliminated shuttle effect) and to increase the electrical conductivity of the cathode layer (for enhanced cathode active material utilization efficiency).

The sulfonated polymer may be selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidene fluoride, sulfonated copolymers of polyvinylidene fluoride with hexafluoropropene and tetrafluoroethylene, sulfonated copolymers of ethylene and tetrafluoroethylene, polybenzimidazole, and chemical derivatives, copolymers, and blends thereof.

These sulfonated polymers can be easily mixed with the aforementioned lithium ion-conducting inorganic species (e.g. $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, and their mixtures) and sodium ion-conducting species or sodium salt via any solution mixing or melt mixing method well-known in the art. These inorganic species are commercially available or readily synthesizable in the laboratory. However, later on, we shall introduce a new approach that entails in situ formation of these lithium ion and/or sodium ion-conducting inorganic species (also referred to as lithium- or sodium-containing inorganic species) on surfaces or in the matrix of various sulfonated polymers and their blends.

In certain embodiments, the polymer matrix or binder comprises a mixture of an electron-conducting polymer and a lithium ion-conducting polymer, wherein the lithium ion-conducting polymer is selected from the group consisting of poly(perfluoro sulfonic acid), sulfonated polytetrafluoroethylene, sulfonated perfluoroalkoxy derivatives of polytetrafluoroethylene, sulfonated polysulfone, sulfonated poly (ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof, wherein the electron-conducting polymer-to-lithium ion-conducting polymer weight ratio is from 1/99 to 99/1. The electron-conducting polymer is selected from the group consisting of polyaniline, polypyrrole, polythiophene, polyfuran, bi-cyclic polymers, derivatives thereof, and combinations thereof. Such a mixture can be a good lithium ion-conductor, but poor electron conductor provided the electron-conducting polymer component of the mixture is less than 30% by volume. The mixture would be a very good electron-conductor if the electron-conducting polymer component of the mixture exceeds 70%.

In certain desirable embodiments, the polymer matrix or binder contains a lithium ion-conducting polymer selected from poly(ethylene oxide) (PEO), Polypropylene oxide, poly(acrylonitrile) (PAN), poly(methyl methacrylate) (PMMA), poly(vinylidene fluoride) (PVDF), Poly bis-methoxy ethoxyethoxide-phosphazenex, Polyvinyl chloride, Polydimethylsiloxane, and poly(vinylidene fluoride)-hexafluoropropylene (PVDF-HFP), a derivative thereof, or a combination thereof.

A preferred and desired embodiment of the present invention is a hybrid solid state electrolyte composition comprising a lithium ion-conducting polymer matrix or binder selected from a sulfonated polymer, a lithium ion-conducting inorganic species or lithium salt, and a sodium ion-conducting species or sodium salt, wherein the lithium ion-conducting inorganic species or lithium salt and the sodium ion-conducting species or sodium salt are dispersed in or chemically bonded by the polymer matrix or binder. The lithium ion-conducting inorganic species is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof. The polymer matrix or binder is in an amount from 1% to 99% by weight of the electrolyte composition (preferably from 5% to 95% and more preferably from 20% to 80%) and a weight ratio between the lithium ion-conducting inorganic species or lithium salt and the sodium ion-conducting species or sodium salt is from 1/99 to 99/1

In this hybrid solid state electrolyte composition, the sodium ion-conducting species or sodium salt is selected from $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, $NaClO_4$, $NaPF_6$, $NaF_4$, $NaAsF_6$, $NaCF_3SO_3$, $NaN(CF_3SO_2)_2$, sodium bis(oxalato)borate, NaBOB, $NaBF_2C_2O_4$, $NaBF_2C_2O_4$, $NaNO_3$, $NaPF_3(CF_2CF_3)_3$, sodium bisperfluoro-ethysulfonylimide, NaBETI, sodium bis(trifluoromethanesulphonyl)imide, sodium bis(fluorosulphonyl)imide, sodium trifluoromethanesulfonimide, NaTFSI, an ionic liquid-based sodium salt, or a combination thereof; wherein X=F, Cl, I, or Br, R=a hydrocarbon group, x=0-1, y=1-4.

The presently invented solid-state electrolyte is not only dendrite penetration resistant but also highly lithium ion-conducting with the conductivity typically $\gg 10^{-5}$ S/cm, more typically $\gg 10^{-4}$ S/cm, and often $>10^{-3}$ S/cm, comparable to those of liquid electrolytes.

These lithium-containing inorganic species can be simply the products or by-products of chemical reactions between the electrolyte (Li salt and solvent) and a carbon material or a conducting polymer. These reactions are induced by externally applied current/voltage in an electrochemical reactor. This will be discussed in more detail later.

In a preferred embodiment, the lithium-containing species may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, a combination thereof, or a mixture with a sodium salt (e.g. $Na_2CO_3$, $Na_2O$, $Na_2C_2O_4$, NaOH, NaiX, $ROCO_2Na$, HCONa, RONa, $(ROCO_2Na)_2$, $(CH_2OCO_2Na)_2$, $Na_2S$, $Na_xSO_y$), wherein X=F, Cl, I, or Br, R=a hydrocarbon group (e.g. R=CH—, $CH_2$—, $CH_3CH_2$—, etc.), x=0-1, y=1-4. These species, when dispersed in a lithium ion-conducting matrix polymer or bonded by such a polymer, are surprisingly capable of forming a structurally sound solid state electrolyte layer that is sufficiently strong to intercept or stop dendrite penetration, yet maintaining a high lithium ion conductivity.

There are several approaches that can be followed to form a solid composite electrolyte containing a lithium ion-conducting polymer and lithium-containing inorganic species selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a mixture thereof. These approaches include:

(a) Solution mixing: This includes dispersion or dissolution of particles of inorganic lithium-containing species and a lithium ion-conducting polymer in a solvent to form a solution or suspension, followed by casting or coating into a preferably film or sheet form, and solvent removal. Some of these polymers (e.g. most of the sulfonated polymers) are soluble in water.

(b) In situ precipitation from solution state: This includes preparation of a solution of lithium-containing inorganic species in a solvent (e.g. dissolution of $Li_2CO_3$, $Li_2C_2O_4$, LiOH, and $LiNO_3$, separately or in combinations, in water), dipping or immersing a porous lithium ion-conducting polymer (e.g. a sulfonated polymer, polyethylene oxide) in this solution, and allowing precipitation of the inorganic species into pores of the lithium ion-conducting polymer.

(c) Melt mixing: This includes mixing and dispersion of particles of inorganic lithium-containing species in the melt of a lithium ion-conducting polymer and then forming of the resulting composite into a desired shape (e.g. melt mixed in a twin-screw extruder and then extruded into a sheet, film, or other desired shapes).

(d) Physical or chemical vapor deposition: For instance, sputtering of inorganic lithium-containing species (lithium ion-conducting inorganic species in the above list; e.g. $Li_2O$ and $Li_2S$) onto surfaces of a lithium ion-conducting polymer. This polymer is preferably in a thin film form, powder form, or porous structure that has a high specific surface area to accommodate the inorganic species deposited thereon. This would lead to a more uniform dispersion of the inorganic species in the polymer matrix.

(e) Electrochemical decomposition of electrolytes on carbon surfaces: This includes electrochemical decomposition of electrolyte solvent/salt and deposition of the desired inorganic lithium-containing species (as reaction products of the electrochemical decomposition) onto the surfaces of a carbon material, followed by dispersion of the inorganic species-coated carbon particles in a polymer matrix. Alternatively, the inorganic lithium-containing species are separated from the carbon substrate and then dispersed in a lithium ion-conducting polymer using solution mixing or melt mixing.

(f) Electrochemical decomposition of electrolytes on polymer surfaces: This includes electrochemical decomposition of electrolyte solvent/salt and deposition of the desired inorganic lithium-containing species (as reaction products of the electrochemical decomposition) onto the surfaces of a lithium-conducting polymer. This polymer is preferably in a thin film form, powder form, or porous structure that has a high specific surface area to accommodate the inorganic species deposited thereon.

The carbon material may be selected from multiple sheets/platelets of a graphene material, multiple flakes of exfoliated graphite, carbon nano-fibers, carbon nanotubes, carbon fibers, graphite fibers, carbon black or acetylene black particles, needle coke, soft carbon particles, hard carbon particles, artificial graphite particles. These particle or fibers preferably have a diameter or thickness less than 10 μm, preferably less than 1 μm, further preferably less than 200 nm, and most preferably less than 100 nm.

The carbon material can be produced by several processes. For instance, thin films of amorphous carbon can be deposited on a solid substrate surface using chemical vapor deposition of hydrocarbon gas introduced into a chamber at a temperature of 400-1,200° C. under a hydrogen or noble gas atmosphere. Alternatively, amorphous carbon can be produced by sputtering of carbon atoms or clusters of C atoms onto a solid substrate surface from a carbon target in a vacuum chamber. The resulting amorphous carbon films, after being deposited with lithium-containing inorganic species, can then be peeled off from the substrate to obtain free-standing films. The lithium-containing inorganic material-coated carbon films are then chopped into small pieces and then dispersed in a sulfonated polymer via solution mixing or melt mixing. Alternatively, the lithium-containing inorganic material-coated carbon film can be deposited with a layer of a lithium ion-conducting polymer prior to being milled into small particles. Small particles of lithium-containing inorganic material/carbon/polymer are then processed into a sheet or film for use as a solid state electrolyte. The proportion of carbon must be minimized to the extent that the resulting composite solid electrolyte is lithium ion-conducting, but not electronically conducting.

Carbon films may also be produced by pyrolyzation of polymer films (including thermoplastic films, thermoset films, coal tar pitch films, petroleum pitch films, etc., free-standing or coated on a solid surface), typically at an initial oxidation temperature of 250-350° C. (e.g. for polyacrylonitrile, PAN), followed by a carbonization treatment at 500-1,500° C. For other polymer films, heat treatments can go directly into the range of 500-1,500° C. without a pre-oxidation (e.g. phenolic resin). These films are herein referred to as polymeric carbon or carbonized resin films. There is no restriction on the kind of polymer or pitch material that can be pyrolyzed to produce the needed carbon matrix; but, preferably, the resin or pitch has a carbon yield of at least 20% (more preferably at least 30% and most preferably from 40% to approximately 75%). The carbon films are then used as a working electrode for receiving lithium-containing inorganic species produced by the electrochemical decomposition of electrolytes.

Thin films of a polymer matrix composite (e.g. a mixture of phenolic resin+CNTs and/or graphene sheets) can be prepared in a free-standing form or coated on a solid substrate. This can be made by a solvent mixing or melt mixing procedure that is well-known in the art. This resin matrix composite is then subjected to the heat treatments as described above (e.g. at a temperature in the range of 500-1,500° C.) to obtain carbon matrix composites. The carbon composite films are then used as a working electrode for receiving lithium-containing inorganic species produced by the electrochemical decomposition of electrolytes.

Alternatively, one can prepare a sheet of porous non-woven, mat, paper, foam, or membrane of a carbon/graphite reinforcement material (e.g. graphene sheets, expanded graphite flakes, CNTs, carbon nano-fibers, etc.) by using any known process. This porous structure is then infiltrated with carbon using chemical vapor deposition (CVD), sputtering, or chemical vapor infiltration (CVI) to obtain a carbon matrix composite. Further alternatively, this porous structure can be impregnated with a resin or pitch material and the resulting composite be pyrolyzed to obtain a carbon matrix composite. The porous carbon sheets are then used as a working electrode for receiving lithium-containing inorganic species produced by the electrochemical decomposition of electrolytes.

The carbon matrix films or carbon matrix composite films can be solid or porous. The pores eventually will be substantially filled with lithium-containing species. The lithium-containing species resulting from electrochemical decomposition of electrolytes (to be explained later) can be attached to the carbon matrix or the carbon/graphite reinforcement particles/fibers/nanotubes.

In addition to or as an alternative to the carbon/graphite reinforcement phase, a filler in the form of multiple particles may be dispersed in the amorphous carbon or polymeric carbon matrix. The filler may be selected from a metal oxide, metal carbide, metal nitride, metal boride, metal dichalcogenide, or a combination thereof. In an embodiment, the filler is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

Preferably, the filler is selected from nano discs, nano platelets, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein the discs, platelets, or sheets have a thickness less than 100 nm. These 2D nano materials are found to be very effective in helping to stop dendrite penetration; however, they are normally not very permeable to lithium ions or sodium ions. Hence, they must be dispersed in a carbon matrix that is permeable to lithium or sodium ions.

Most preferably, a lithium ion-conducting polymer (e.g. a sulfonated polymer or its mixture, with or without a filler) can be made into a thin film, paper sheet, fiber, web, grid, non-woven mat, and other porous structural shape, which is then deposited with the lithium-containing inorganic species produced by electrochemical decomposition of electrolytes.

Electrochemical decomposition of electrolytes: The preparation of desired inorganic lithium-containing species may be conducted in an electrochemical reactor, which is an apparatus similar to an electrode plating system but operated in very distinct conditions. In this reactor, a sulfonated conducting polymer and/or an amorphous carbon or polymeric carbon matrix (with or without a carbon/graphite reinforcement material), in the form of a mat, paper, film, etc., is used as a working electrode and lithium sheet as a counter electrode. Contained in the reactor is an electrolyte composed of a lithium salt dissolved in a solvent (e.g. 1M $LiPF_6$ dissolved in a mixture of ethylene carbonate (EC) and dimethyl carbonate (DMC) at a 1:1 ratio by volume). A current is then imposed between these two electrodes (lithium sheet electrode and the carbon working electrode).

The sulfonated polymer or carbon material (e.g. carbon matrix and the carbon/graphite reinforcement material) in the working electrode are galvanostatically discharged (e.g. Li ions being sent to and captured by these polymer and/or carbon material and charged (Li ions released by the polymer or carbon material) in the voltage range from 0.01V to 4.9V at the current densities of 100-1000 mA/g following a voltage-current program similar to what would be used in a lithium-ion battery. However, the system is intentionally subjected to conditions conducive to oxidative degradation of electrolyte (e.g. close to 0.01-1.0 V vs. $Li/Li^+$) or reductive degradation of electrolyte (4.1-4.9 V vs. $Li/Li^+$) for a sufficient length of time. The degradation products react with $Li^+$ ions, Li salt, functional groups (if any) or carbon atoms on/in the carbon matrix or carbon/graphite reinforcement to form the lithium-containing species that also chemically bond to the carbon matrix or composite. We have also surprisingly observed that, when a sulfonated polymer or polymer mixture is subjected to comparable electrochemical treatment conditions, various desired lithium-containing inorganic species are formed on polymer surfaces.

The chemical compositions of the lithium-containing species are governed by the voltage range, the number of cycles (from 0.01 V to 4.9 V, and back), solvent type, lithium salt type, chemical composition of carbon/graphite phase (e.g. % of O, H, and N attached to CNTs, CNFs, exfoliated graphite flakes, graphene sheets, etc.), and electrolyte additives (e.g. $LiNO_3$, if available). The morphology, structure and composition of carbon/graphite reinforcement phase, the amorphous carbon matrix, the lithium-containing species that are bonded to the carbon material or sulfonated polymer can be characterized by scanning electron microscope (SEM), transmission electron microscope (TEM), Raman spectrum, X-ray diffraction (XRD), Fourier Transform Infrared Spectroscopy (FTIR), elemental analysis, and X-ray photoelectron spectroscopy (XPS).

Figure 2:
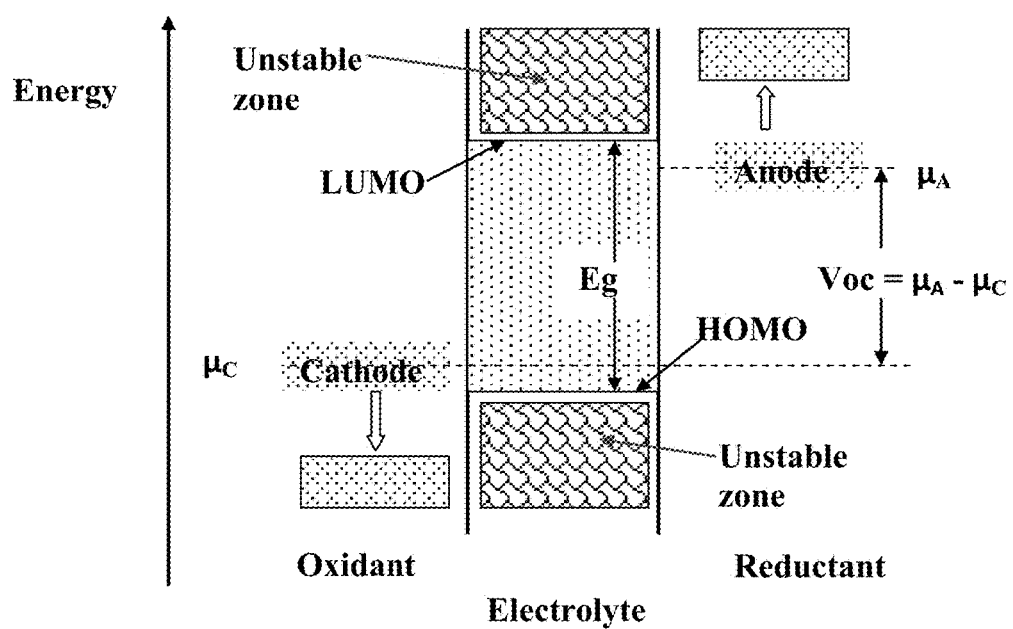
FIG. 2 An electrochemical energy diagram to illustrate electrochemical potential or energetic conditions under which electrolyte in an electrochemical reactor undergoes oxidative or reductive degradation at the electrode-electrolyte boundary.

The decomposition of non-aqueous electrolyte leads to the formation of lithium chemical compounds that bond to surface/ends of CNTs, graphene surfaces and edges, functional groups of chemically treated carbon black particles, a conducting polymer, etc. The reasons why the non-aqueous electrolyte is decomposed during discharge-charge cycling in an electrochemical reactor may be explained as follows. As illustrated in FIG. 2, in an electrochemical reactor system where there are a cathode and an anode in contact with an electrolyte, the thermodynamic stability of the electrolyte is dictated by the relative electron energies of the two electrodes relative to the energy level of the non-aqueous electrolyte. The anode is potentially a reductant, and the cathode an oxidant. The two electrodes are typically electronic conductors and, in this diagram, their electrochemical potentials are designated as $\mu_A$ and $\mu_C$ (or Fermi energies $\varepsilon_F$), respectively. The energy separation, $E_g$, between the lowest unoccupied molecular orbital (LUMO) and the highest occupied molecular orbital (HOMO) of the electrolyte is the stable electrochemical window of the electrolyte. In other words, in order for the electrolyte to remain thermodynamically stable (i.e. not to decompose), the electrochemical potential of the anode ($\mu_A$) must be maintained below the LOMO and $\mu_C$ of the cathode must be above the HOMO.

From the schematic diagram of FIG. 2, we can see that an anode with $\mu_A$ above the LUMO and a cathode with $\mu_C$ below the HOMO will reduce and oxidize the electrolyte, respectively, unless a passivating film is formed that creates a barrier to electron transfer between the anode and electrolyte or between the cathode and the electrolyte. In the presently invented method, an external current/voltage is intentionally applied over the anode and the cathode to bias their respective electrochemical potential levels so that the electrolyte can go outside of the stable electrochemical potential window, undergoing oxidative and/or reductive degradation. The degradation products are reactive species that react among themselves and with the functional groups or active atoms of the electrode polymer or carbon material, forming a mass of lithium-containing species that bond to the conducting polymer or the carbon material.

For the list of lithium salts and solvents investigated, the electrolytes have an oxidation potential (HOMO) at about 4.7 V and a reduction potential (LUMO) near 1.0 V. (All voltages in this specification are with respect to Li$^+$/Li). We have observed that the chemical interaction of Li$^+$ ions with graphene planes or edges occur at about 0.01-0.8 V, so electrolytes are prone to reductive degradation in the voltage range of 0.01-0.8 V. By imposing a voltage close to 4.7 volts, the electrolytes are also subject to oxidative degradation. The degradation products spontaneously react with chemical species associated with the carbon matrix and/or reinforcement materials (e.g. graphene planes or edges), forming a material phase that bonds together with carbon matrix and/or reinforcement materials during the charge-discharge cycling (electrolyte reduction-oxidation cycling). In general, these lithium-containing species are not electrically conducting and, hence, these reactions can self-terminate to form essentially a passivating phase.

The electrolytes that can be used in this electrochemical decomposition reactor may be selected from any lithium or sodium metal salt that is dissolvable in a solvent to produce an electrolyte. Preferably, the metal salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), or a combination thereof. It may be noted that these metal salts are also commonly used in the electrolytes of rechargeable lithium batteries.

The electrolytes used in this electrochemical reactor may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. These solvents are also commonly used in the electrolytes of rechargeable lithium or sodium batteries.

The porous structure (e.g. paper, mat, foam, etc.) of a carbon material or a sulfonated polymer) is subjected to the electrochemical decomposition treatment to form the lithium-containing species in the interstitial spaces, gaps, or voids (if any) but bonded to the pore walls, or simply bonded to surfaces of the carbon matrix or sulfonated polymer to form a solid state electrolyte material.

For industrial-scale production of the presently invented solid state electrolyte, the electrochemical decomposition treatment may be carried out in a roll-to-roll manner. In an embodiment, the continuous-length paper (or mat, foam, membrane, etc.) of a carbon material or sulfonated polymer (as an example of lithium ion-conducting polymer) may be unwound from a feeder roller, and moved to enter an electrochemical treatment zone (essentially an electrochemical decomposition reactor) containing an electrolyte therein. A lithium metal electrode is immersed in this electrolyte and the paper is also electrically wired as the working electrode. The paper is moved at a controlled speed to give enough time for electrochemical decomposition of the electrolyte to occur. The paper, impregnated with and/or bonded by the decomposition products, is then wound up on a take-up roller. This roll-to-roll or reel-to-reel process can be easily scaled up and automated for mass production of the presently invented solid electrolyte products.

In an alternative embodiment, the continuous-length paper may be unwound from a feeder roller, deposited with some lithium metal (e.g. using physical vapor deposition or sputtering of Li) while the carbon or sulfonated polymer paper is in a dry state (before contacting electrolyte). The Li-deposited paper is then moved to enter an electrochemical treatment zone containing an electrolyte therein. As soon as the Li-paper layer enters the electrolyte, essentially short-circuiting occurs between the carbonaceous or polymeric paper and Li. In other words, the paper "electrode" is essentially placed in an electrochemical potential that is 0 V with respect to Li$^+$/Li, subjecting the electrolyte to a reductive decomposition and enabling decomposition products to react with carbon or polymer. Optionally, a lithium electrode is implemented and immersed in this electrolyte and the paper is also electrically wired as the working electrode.

Such an arrangement aids in continuing the electrochemical decomposition of electrolytes and formation of the Li-containing species. The carbon or polymer paper is moved at a controlled speed to give enough time for electrochemical decomposition of the electrolyte to occur. The paper, impregnated with and bonded by the decomposition products, is then wound up on a take-up roller. Again, this roll-to-roll process is highly scalable and can be fully automated for cost-effective production of the desired solid state electrolyte product.

In yet another embodiment, a layer of alkali metal anode (e.g. a stand-along Li foil, or a nano-structured current collector deposited with some lithium metal) is deposited with a layer of carbon or polymer (e.g. using a spraying procedure) up to a thickness from 2 nm to 20 μm to form a two-layer or three-layer laminate. Alternatively, a layer of alkali metal anode (containing one layer of Li foil alone or a two-layer configuration composed of a nano-structured current collector and a layer of Li metal, for instance) is directly laminated with a layer of pre-fabricated sulfonated polymer paper/mat to form a 2-layer or 3-layer laminate. This laminate is then combined with an anode and a cathode to form a multiple-layer battery structure.

The solid state electrolyte of the instant invention typically exhibits a lithium ion conductivity from $2.5\times10^{-5}$ S/cm to $5.5\times10^{-3}$ S/cm, and more typically from $1.0\times10^{-4}$ S/cm to $2.5\times10^{-3}$ S/cm. There is no restriction on the thickness of the solid electrolyte between an anode and a cathode; but for practical purposes, the solid electrolyte layer preferably has a thickness from 2 nm to 20 μm, more preferably from 10 nm to 10 μm, and most preferably from 100 nm to 1 μm.

The cathode active material in this rechargeable alkali metal battery may be selected from sulfur, selenium, tellurium, lithium sulfide, lithium selenide, lithium telluride, sodium sulfide, sodium selenide, sodium telluride, a chemically treated carbon or graphite material having an expanded inter-graphene spacing $d_{002}$ of at least 0.4 nm, or an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof. Preferred cathode active materials include non-lithiated and slightly lithiated compounds having relatively high lithium or sodium storage capacities, such as $TiS_2$, $MoS_2$, $MnO_2$, $CoO_2$, and $V_2O_5$.

A novel family of 2D metal carbides or metal carbonides, now commonly referred to as MXenes, can be used as a cathode active material. MXenes can be produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $(Ti_{0.5}, Nb_{0.5})_2CT_x$, $Nb_2CT_x$, $V_2CT_x$, $Ti_3C_2T_x$, $(V_{0.5}, Cr_{0.5})_3C_2T_x$, $Ti_3CNT_x$, $Ta_4C_3T_x$, and $Nb_4C_3T_x$.

In an embodiment, the cathode layer contains an air cathode and the battery is a lithium-air battery. In another embodiment, the cathode active material is selected from sulfur or lithium polysulfide and the battery is a lithium-sulfur battery. In yet another embodiment, the cathode active material may be selected from an organic or polymeric material capable of capturing or storing lithium ions (e.g. via reversibly forming a redox pair with lithium ion).

The electrolytic salts to be incorporated in a sulfonated polymer to form a solid state electrolyte for a lithium secondary battery may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), an ionic liquid salt, and their sodium counterparts. Among them, $LiPF_6$, $LiBF_4$ and $LiN(CF_3SO_2)_2$ are preferred.

The ionic liquid (if containing a lithium salt or itself being a lithium salt) may also be electrochemically decomposed to produce the desired lithium-containing inorganic species. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, $n$-$C_3F_7BF_3^-$, $n$-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

At the anode side, lithium metal may be a layer of Li metal or alloy (>70% by weight of Li, preferably >80%, and more preferably >90%). Alternatively, the Li metal or alloy may be supported by a nano-structure composed of conductive nano-filaments. For instance, multiple conductive nano-filaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nano-filament may be selected from, as examples, a carbon nano fiber (CNF), graphite nano fiber (GNF), carbon nano-tube (CNT), metal nano wire (MNW), conductive nano-fibers obtained by electro-spinning, conductive electro-spun composite nano-fibers, nano-scaled graphene platelet (NGP), or a combination thereof. The nano-filaments may be bonded by a binder material selected from a polymer, coal tar pitch, petroleum pitch, meso-phase pitch, coke, or a derivative thereof.

Nano fibers may be selected from the group consisting of an electrically conductive electro-spun polymer fiber, electro-spun polymer nanocomposite fiber comprising a conductive filler, nano carbon fiber obtained from carbonization of an electro-spun polymer fiber, electro-spun pitch fiber, and combinations thereof. For instance, a nano-structured electrode can be obtained by electro-spinning of polyacrylonitrile (PAN) into polymer nano-fibers, followed by carbonization of PAN. It may be noted that some of the pores in the structure, as carbonized, are greater than 100 nm and some smaller than 100 nm.

In summary, a possible lithium metal cell may be comprised of an alkali metal layer (e.g. Li foil, etc.), an anode current collector (e.g. Cu foil and/or a nano-structure of interconnected conductive filaments), a solid state electrolyte phase, a cathode, and an optional cathode current collector (e.g. Al foil and/or a nano-structure of interconnected conductive filaments, such as graphene sheets and carbon nano-fibers).

The following examples serve to illustrate the preferred embodiments of the present invention and should not be construed as limiting the scope of the invention:

EXAMPLE 1

Synthesis of Sulfonated Polyaniline (S-PANi)

The chemical synthesis of the S-PANi polymers was accomplished by reacting polyaniline with concentrated sulfuric acid. The procedure was similar to that used by Epstein, et al. (U.S. Pat. No. 5,109,070, Apr. 28, 1992). The resulting S-PANi can be represented by the following Formula 1, with $R_1$, $R_2$, $R_3$, and $R_4$ group being H, $SO_3$ or $SO_3H$ ($R_5$=H) with the content of the latter two being varied between 30% and 75% (i.e., the degree of sulfonation varied between 30% and 75%).

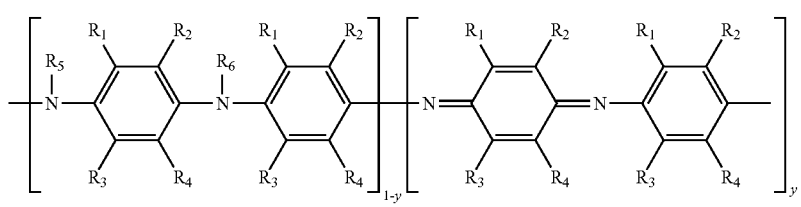

(Formula 1)

The lithium ion conductivity of these $SO_3^-$ or $SO_3H$-based S-PANi compositions was in the range of $8.5 \times 10^{-5}$ S/cm to $4.6 \times 10^{-3}$ S/cm and their electron conductivity in the range of 0.1 S/cm to 0.5 S/cm when the degree of sulfonation was from approximately 30% to 75% (with y being approximately 0.4-0.6).

The solid state electrolyte was obtained by dissolving S-PANi in water or acetonitrile to form a polymer-water or polymer-solvent solution and dissolving commercially available $Li_2CO_3$, $Li_2C_2O_4$, LiOH, $LiNO_3$, and $Li_2SO_4$ and their mixtures of various proportions in water/solvent to form lithium salt solutions. The S-PANi-water/solvent solution and various separate lithium salt solutions were then mixed together in several proportions to obtain mixture solutions, which were cast into thin films and then dried to produce solid state electrolyte films having a thickness from 150 nm to 15 μm.

In several samples, a mixture solution composed of lithium-containing inorganic species and PANi dissolved in water/solvent was sprayed on surfaces of a pre-fabricated sulfur cathode electrode (explained in an example later) to form a solid state electrolyte layer having 5-25% by weight of $Li_2CO_3$—$Li_2SO_4$ (50/50) and 75-95% PANi. This electronically conducting layer (2.5 μm thick) was used to eliminate the shuttling effect of sulfur and lithium sulfide in a Li—S cell. In such a lithium cell, a thin layer of sulfonated PEEK (lithium ion-conducting, but not electron-conducting) 3 μm thick was implemented on the surface of a Li foil at the anode side. As a result a hybrid solid electrolyte was used in this Li—S cell.

EXAMPLE 2

Sulfonated Conducting Polymers (Sulfonated Polypyrrole, S-PPy)

A sulfonated pyrrole-based polymer (with X=NH and Y=$SO_3^-$, m=1, and A=H in the following formula) was synthesized by following a procedure adapted from Aldissi, et al., U.S. Pat. No. 4,880,508, Nov. 14, 1989.

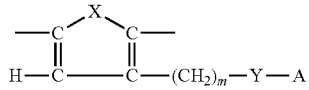

(Formula 2)

Approximately 5.78 g of the resulting sulfonated pyrrole-based polymer was dissolved in 100 ml of distilled water. Then, 105 ml of 0.98% aqueous LiOH and $LiNO_3$ (50/50) were added to the sulfonated polypyrrole (S-PPy)-polyethylene oxide (PEO) water suspension over the course of 60 minutes while stirring constantly. The resulting polypyrrole-inorganic species composite was used as a solid state electrolyte.

EXAMPLE 3

Preparation of Poly (Alkyl Thiophene) as an Electron-Conducting Component of a Mixture Water-soluble conductive polymers having a thiophene ring (X=sulfur) and alkyl groups containing 4 carbon atoms (m=4) in the above Formula 2 were prepared, according to a method adapted from Aldissi, et al. (U.S. Pat. No. 4,880, 508, Nov. 14, 1989). The surfactant molecules of these polymers were sulfonate groups with sodium. Conductivity of this polymer in a self-doped state were from about $10^{-3}$ to about $10^{-2}$ S/cm. When negative ions from a supporting electrolyte used during synthesis were allowed to remain in the polymer, conductivities up to about 50 S/cm were observed.

A doped poly (alkyl thiophene) (PAT) with Y=$SO_3H$ and A=H in Formula 6 that exhibited an electron conductivity of 12.5 S/cm was dissolved in water. A sulfonated poly(ether ether ketone)-based material called poly (phthalazinon ether sulfone ketone) (PPESK), having a degree of sulfonation of approximately 93%, was soluble in an aqueous hydrogen peroxide ($H_2O_2$) solution. A water solution of 3 wt. % poly (alkyl thiophene) and an aqueous $H_2O_2$ solution of 3 wt. % sulfonated PPESK was mixed at several PPESK-to-PAT ratios and stirred at 70° C. to obtain several polymer blend solution samples.

Samples of poly (alkyl thiophene)-PPESK mixtures (containing lithium salt) in a thin film form were obtained by casting the aforementioned solutions onto a glass plate, allowing water to evaporate. The lithium and electron conductivity values of the resulting solid samples were then measured at room temperature. The results indicate that good electron and lithium ion conductivities can be obtained within the range of 30-70% PPESK. It may be noted that poly (alkyl thiophene) can go through the complexing and reduction procedures to obtain a water soluble polymer. In this case, PPESK can be used to improve the lithium ion conductivity.

EXAMPLE 4

Bi-cyclic Conducting Polymer as a Lithium Ion-Conducting Polymer

The preparation of conductive polymers represented by Formula 3 having H for both $R_1$ and $R_2$, S for X, and $H^+$ for M was accomplished by following a procedure suggested by Saida, et al. (U.S. Pat. No. 5,648,453, Jul. 15, 1997).

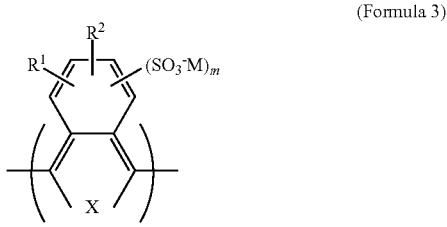

(Formula 3)

These polymers exhibit electronic conductivity in the range of $5 \times 10^{-2}$ S/cm to 1.4 S/cm and lithium ion conductivity of $6.5 \times 10^{-4}$ S/cm $2.5 \times 10^{-2}$ S/cm.

Six polymer blends were prepared from such a bi-cyclic polymer (electron conductivity $\Phi_e=1.1$ S/cm and lithium ion conductivity $\Phi_p=3.5 \times 10^{-3}$ S/cm) and approximately 50% by wt. of the following lithium-conducting polymers: poly (perfluoro sulfonic acid) (PPSA), sulfonated PEEK (S-PEEK), sulfonated polystyrene (S-PS), sulfonated PPESK, sulfonated polyimide (S-PI), and sulfonated polyaniline (S-PANi). The conductivities of the resulting polymer blends are $\Phi_e=0.22$ S/cm and $\Phi_p=2.8 \times 10^{-3}$ S/cm for (bi-cyclic+PPSA), $\Phi_e=0.2$ S/cm and $\Phi_p=3.6 \times 10^{-3}$ S/cm for (bi-cyclic+S-PEEK), $\Phi_e=0.23$ S/cm and $\Phi_p=5.6 \times 10^{-3}$ S/cm for (bi-cyclic+S-PS), $\Phi_e=0.19$ S/cm and $\Phi_p=4.6 \times 10^{-3}$ S/cm for (bi-cyclic+S-PPESK), $\Phi_e=0.21$ S/cm and $\Phi_p=2.3 \times 10^{-3}$ S/cm for (bi-cyclic+S-PI), and $\Phi_e=0.75$ S/cm and $\Phi_p=1.4 \times 10^{-3}$ S/cm for (bi-cyclic+S-PANi), The lithium ion conductivity values are all within the acceptable ranges for these polymer blends to be a good matrix material for embedding the lithium-containing inorganic species in a solid state electrolyte composition.

EXAMPLE 5

Sulfonation of Electrically Non-conducting Polymers

Polytetrafluoroethylene (PTFE), polysulfone (PSf), poly (ether ether ketone) (PEEK), polyimide (PI), and styrene-butadiene copolymers (SB) were separately immersed in a concentrated sulfuric acid (95%+5% water) at 65-90° C. for 4-48 hours to obtain sulfonated polymers. These sulfonated polymers were found to be electrically insulating ($<10^{-8}$ S/cm), but lithium ion-conducting (typically $3 \times 10^{-5}$ S/cm-$4.5 \times 10^{-3}$ S/cm, depending on the degree of sulfonation).

These highly sulfonated polymers alone, or its mixture with a lithium salt or lithium-containing inorganic species, can be used as a solid state electrolyte. It is unexpected for us to discover that a simple mixture of a sulfonated polymer and a commonly used lithium salt (e.g. $LiClO_4$, $LiPF_6$, $LiBF_4$, $LiAsF_6$, $LiCF_3SO_3$, $LiN(CF_3SO_2)_2$, LiBOB, $LiBF_2C_2O_4$, $LiBF_2C_2O_4$, $LiPF_3(CF_2CF_3)_3$, LiBETI, and LiTFSI, just to name a few) makes an exceptional solid-state electrolyte that can be easily and cost-effectively prepared and that are highly lithium ion-conducting.

Alternatively, these sulfonated polymers can be mixed with the lithium-containing inorganic species that are not normally used as a lithium salt in lithium-ion battery industry (e.g. $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$) to form a solid state electrolyte.

EXAMPLE 6

Preparation of Lithium-Containing Inorganic Species on Surfaces of a Carbon or Sulfonated Polymer Two approaches were followed to produce lithium-containing inorganic species on surfaces of a carbon or sulfonated polymer layer via electrochemical decomposition of lithium salt-solvent electrolytes.

The first entails preparing an electrochemical electrode composed of a sulfonated conductive polymer in a porous foam structure using a chemical foaming agent or a freeze-drying procedure. Some of these electrodes were deposited with a layer of amorphous carbon, 0.5-3 µm thick using sputtering or low-temperature CVD. The porous electrode (with or without a carbon coating) and a lithium foil (20 µm thick) were then laminated together. This two-layer structure was then immersed in a lithium salt-solvent solution (e.g. $LiClO_4$, $LiPF_6$, and/or $LiBF_4$, in an organic solvent, PC, EC, or DEC). This would create an internal short circuiting situation (since carbon or sulfonated polymer and lithium are originally at different electrochemical potential levels), inducing decomposition of electrolyte that produces lithium-containing inorganic species on surfaces of carbon or conducting polymer. After 20-120 minutes, the polymer layer (now coated or impregnated with some lithium-containing inorganic species (e.g. $Li_2CO_3$, $Li_2O$, $Li_2C_2O_4$, LiCl, LiF, $Li_4B$, or their mixtures). The coated or impregnated polymer is then directly melted and re-cast into a film, or milled into small pieces and then mixed with additional amounts of $Li_2CO_3$, $Li_2O$, $Li_2C_2O_4$, LiCl, LiF, and/or $Li_4B$ (if so desired) and/or other type of sulfonated polymer and extruded into composite films. These films are used as solid state electrolyte.

The second approach is described in Example 7 below.

EXAMPLE 7

Electrochemical Preparation of Lithium-Containing Inorganic Species on a Carbon Material or a Conducting Polymer The preparation of solid state electrolytes was carried out in an electrochemical reactor, an apparatus very similar to an electrode plating system. In this reactor, a layer of carbon matrix, carbon matrix composite structure (in the form of a mat, paper, film, etc.), or conducting polymer (prepared in Examples 1, 2 and 5) was used as a working electrode and lithium sheet as both the counter and reference electrodes. Inside the reactor is an electrolyte composed of 1M $LiPF_6$ dissolved in a mixture of ethylene carbonate (EC) and dimethyl carbonate (DMC) (1:1 by volume), as an example. The carbon material or conducting sulfonated polymer layer in the working electrode was galvanostatically discharged (Li ions being sent to this working electrode) and charged (Li ions partially released by this working electrode) in the voltage range from 0.01V to 4.9V at the current densities of 100-1000 mA/g following a voltage-current program similar to what would be used in a lithium-ion battery. However, the system was intentionally subjected to conditions conducive to oxidative degradation of electrolyte (close to 0.01-1.0 V vs. Li/Li$^+$) or reductive degradation of electrolyte (e.g. 4.1-4.9 V vs. Li/Li$^+$) for a sufficient length of time. The degradation products react with Li$^+$ ions, Li salt, functional groups (if any) or carbon atoms on the carbon material or sulfonated polymer to form the lithium-containing species that are bonded to the working electrode material.

The chemical compositions of the lithium-containing species are governed by the voltage range, the number of cycles (from 0.01 V to 4.9 V, and back), solvent type, lithium salt type, chemical composition of carbon matrix and the carbon/graphite reinforcement phase (e.g. % of O, H, and N), and electrolyte additives (e.g. LiNO$_3$), if available.

The morphology, structure and composition of the carbon matrix, composites, the lithium-containing species that are bonded to carbon matrix or composites were characterized by scanning electron microscope (SEM), transmission electron microscope (TEM), Raman spectrum, X-ray diffraction (XRD), and X-ray photoelectron spectroscopy (XPS). An extensive investigation that covers a broad range of lithium salts, solvents, and additives lead to the following discoveries:

A wide range of lithium-containing inorganic species were formed in a controlled manner and these species were well-bonded to the carbon material or sulfonated polymer. The resulting lithium chemical species, when dispersed in or bonded by a sulfonated polymer, are of structural integrity, robust enough to intercept metal dendrites or stop dendrite penetration through this solid state electrolyte.

In these working electrode layers, species (CH$_2$OCO$_2$Li)$_2$ is a two-electron reduction product of ethylene carbonate (EC) in an EC-based electrolytes. ROCO$_2$Li species are present between carbon or graphitic material (or a conducting polymer) in electrolytes containing propylene carbonate (PC), especially when the concentration of PC in the electrolyte is high. Li$_2$CO$_3$ is present on carbon matrix or carbon/graphite reinforcement surfaces in EC or PC based electrolytes when a higher voltage is imposed for an extended period of time. This species also appear as a reaction product of semi-carbonates with HF or water or CO$_2$. ROLi is produced on a carbon material in ether electrolytes such as tetrahydrofuran (THF), dimethyl carbonate (DMC), or ethyl methyl carbonate (EMC) as an electrochemical reduction product at an electrochemical potential lower than 0.5 V vs. Li/Li$^+$.

LiF is readily formed in electrolytes containing fluorinated salts such as LiAsF$_6$, LiPF$_6$, and LiBF$_4$, as a salt reduction product. Li$_2$O is a degradation product of Li$_2$CO$_3$. LiOH is formed when a small but controlled amount of water is added to the reactor. Species such as Li$_2$C$_2$O$_4$, Li carboxylate, Li methoxide, are formed in electrolytes containing 1-2 M of LiPF$_6$ in EC:EMC (e.g. at a 3:7 ratio). HCOLi is formed when methyl formate is used as a co-solvent or additive in the electrolyte.

The lithium-containing inorganic species are typically deposited on surfaces of a polymer or impregnated into pores of a conductive porous polymer. The coated or impregnated polymer is then directly melted and re-cast into a film, or milled into small pieces and then mixed with additional amounts of Li$_2$CO$_3$, Li$_2$O, Li$_2$C$_2$O$_4$, LiCl, LiF, and/or Li$_4$B (if so desired) and/or other type of sulfonated polymer and extruded into composite films. Alternatively, the coated or impregnated carbon material is then milled into small pieces and then mixed with additional amounts of Li$_2$CO$_3$, Li$_2$O, Li$_2$C$_2$O$_4$, LiCl, LiF, and/or Li$_4$B (if so desired) and a sulfonated polymer (as a matrix or binder) and extruded into composite films These films are used as solid state electrolyte.

Table 1 below demonstrates that the presently invented hybrid solid state electrolytes exhibit lithium ion conductivity values that are superior to those of known solid state electrolytes, either ceramic or polymer-based. The presence of a desired amount of sodium salt or sodium-conducting species further significantly increases the lithium-ion conductivity. These conductivity values were measured by the well-known electric impedance method.

TABLE 1

Lithium ion conductivity of various solid state electrolyte compositions.

Figure 3:
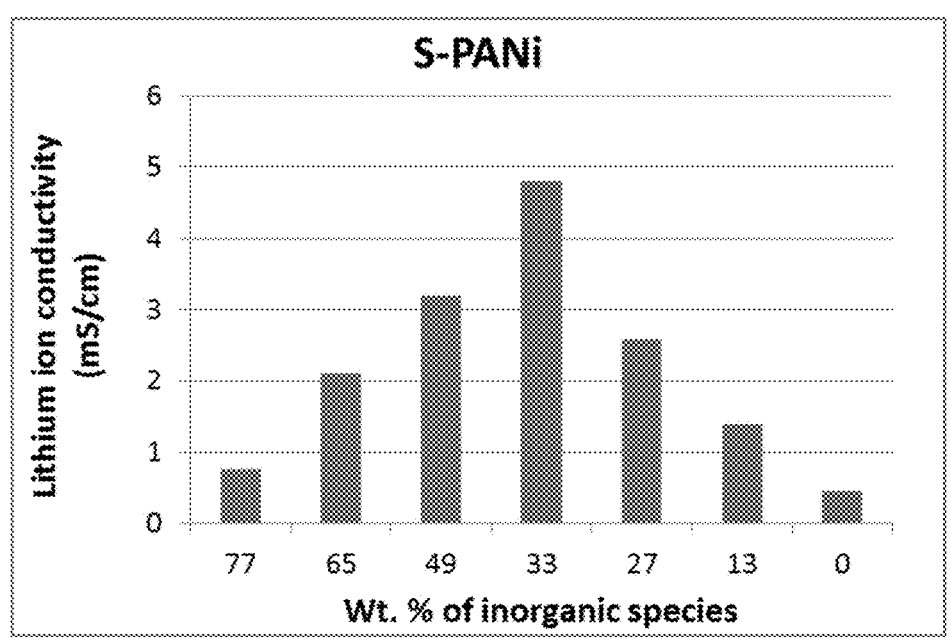
FIG. 3 Lithium ion conductivity values plotted as a function of lithium-containing inorganic species percentage in a sulfonated polyaniline matrix.

| Sample No. | Lithium-containing inorganic species | Lithium-conducting polymer (sulfonated polymer) | Li-ion conductivity (S/cm) |
|---|---|---|---|
| A1-1 | Li$_2$CO$_3$ + (CH$_2$OCO$_2$Li)$_2$ | S-PANi (23-100% by wt.) | $4.6 \times 10^{-4}$ to $4.8 \times 10^{-3}$ S/cm (also see FIG. 3) |
| A1-2 | Li$_2$CO$_3$ + (CH$_2$OCO$_2$Li)$_2$ | S-PEEK (12-100% by wt.) | $6.4 \times 10^{-4}$ to $3.6 \times 10^{-3}$ S/cm |
| A1-3 | Li$_2$CO$_3$ + (CH$_2$OCO$_2$Li)$_2$ | S-PTFE | $2.2 \times 10^{-4}$ to $1.2 \times 10^{-3}$ S/cm |
| A1-3b | Na$_2$CO$_3$ + (CH$_2$OCO$_2$Li)$_2$ | S-PTFE | $3.4 \times 10^{-4}$ to $2.3 \times 10^{-3}$ S/cm |
| A1-4 | Li$_2$CO$_3$ + (CH$_2$OCO$_2$Li)$_2$ | S-PI | $7.4 \times 10^{-4}$ to $4.8 \times 10^{-3}$ S/cm |
| A1-5 | Li$_2$CO$_3$ + (CH$_2$OCO$_2$Li)$_2$ | S-PSf | $8.7 \times 10^{-4}$ to $3.6 \times 10^{-3}$ S/cm |
| B1 | LiF + LiOH + Li$_2$C$_2$O$_4$ | S-PSf | $8.7 \times 10^{-4}$ to $2.1 \times 10^{-3}$ S/cm |
| B1-b | LiF + NaOH + Li$_2$C$_2$O$_4$ | S-PSf | $9.6 \times 10^{-4}$ to $3.6 \times 10^{-3}$ S/cm |
| B2 | LiF + HCOLi | S-PPy | $2.1 \times 10^{-4}$ to $8.6 \times 10^{-4}$ S/cm |
| B3 | LiOH | S-PAT | $2.7 \times 10^{-4}$ to $1.1 \times 10^{-3}$ S/cm |
| B4 | Li$_2$CO$_3$ | S-PEEK | $6.4 \times 10^{-4}$ to $3.9 \times 10^{-3}$ S/cm |
| B5 | Li$_2$C$_2$O$_4$ | S-PSf + PEO | $9.3 \times 10^{-4}$ to $7.7 \times 10^{-3}$ S/cm |
| B6 | Li$_2$CO$_3$ + LiOH | S-PANi + S-PEEK | $1.4 \times 10^{-3}$ to $6.6 \times 10^{-3}$ S/cm |
| B6-b | Na$_2$CO$_3$ + LiOH | S-PANi + S-PEEK | $2.7 \times 10^{-3}$ to $7.8 \times 10^{-3}$ S/cm |

EXAMPLE 8

Preparation of Solid State Electrolytes Containing Lithium-Containing Inorganic Species in a Sulfonated Polymer Via Solution or Melt Mixing Heavily sulfonated polymers, after sulfonation, were typically dried at 50° C. for 2 days prior to its use. The lithium salts were dried at the temperature specified below: $LiCF_3SO_3$ at 50° C. for 2 days, $LiAsF_6$ used as received, $LiBF_4$ at 50° C. for 2 days, $LiAlCl_4$ and $LiPF_6$ at 50° C. for 1 day. All of these lithium salts and sulfonated polymers dissolve easily in acetonitrile or water and electrolyte films were cast from this solvent or water.

The data in Table 2 below again demonstrates that the presently invented solid state electrolytes (sulfonated polymer+lithium salt) exhibit lithium ion conductivity values that are superior to those of known solid state electrolytes. The presence of a desired amount of sodium salt or sodium-conducting species further significantly increases the lithium-ion conductivity.

Perfuoroalkyl sulfonic-type conducting salts like lithium tri-fluoromethanesulfonate (LiTf), lithiumbis(tri-fluoromethanesulfonimidate) (LiTFSI), lithiumbis (tri-fluoro methanesulfonimide) (LiBETI), and lithiumbis(fluorosulfonyl) amide (LiFSI) are found to have high solubility in sulfonated polymers, high ionic conductivity, and high electrochemical stability. These lithium salts with large anions can easily dissociate in the sulfonated polymer host and set off the free lithium cations, resulting in the increase in ionic conductivity. It may be noted that the addition of a Li salt is known to reduce the crystallinity of PEO, but significantly increases the glass transition temperature of PEO, thereby reducing the mobility of EO segments and, hence, Li ion conductivity. Surprisingly, this problem does not occur in the sulfonated polymers.

It may be noted that the prior art all-solid-state lithium-ion batteries (LIBs) based on inorganic solid electrolyte (ISEs) suffer from the issues of poor cycle performance, resulting from an unstable electrolyte/electrode interface during the process of charging/discharging. The ISEs are not compliant or conformal to the shape or dimensional changes of an electrode, leading to poor interfacial contact. In addition, the high rigidity of ISEs leads to poor conformability, which limits their applications in flexible devices. The presently invented sulfonated polymer based solid state electrolytes have essentially eliminated these problems long associated with ISEs and polymer-based solid-state electrolytes.

EXAMPLE 9

Figure 4:
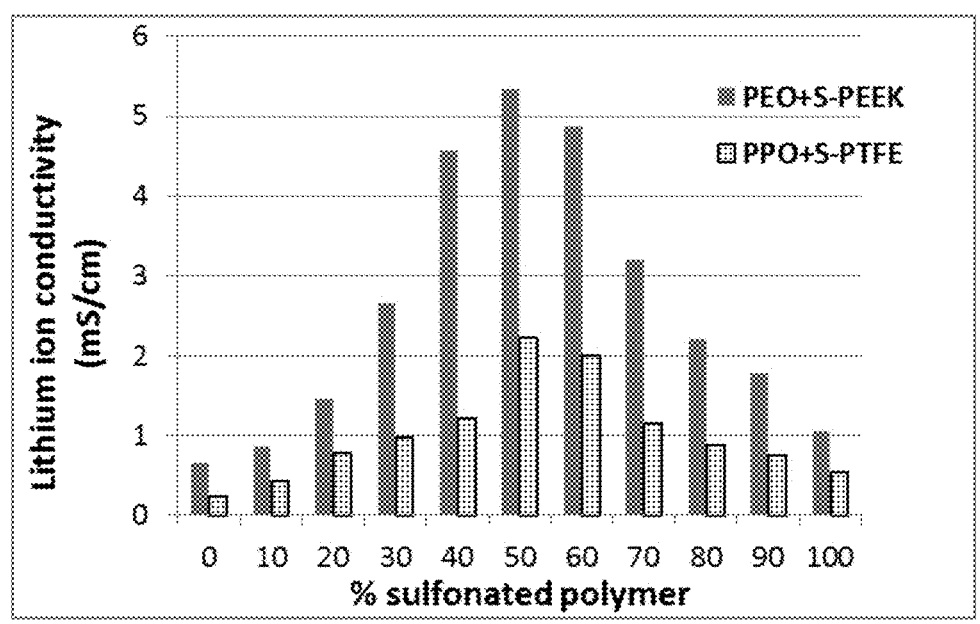
FIG. 4 Lithium ion conductivity values in a solid polymer mixture of a sulfonated polymer (S-PEEK or S-PTFE) and a conventional electrolyte polymer (PEO or PPO) plotted as a function of the sulfonated polymer proportion (each containing 30% by weight of lithium salt).

Preparation of Solid State Electrolytes Containing Lithium-Containing Inorganic Species in a (Non-Sulfonated) Lithium Ion-Conducting Polymer Via Solution or Melt Mixing Another group of presently invented solid state electrolytes is characterized by being composed of (a) a conventional electrolyte polymer (e.g. PEO, PPO, etc.) or its mixtures with a sulfonated polymer and (b) lithium-containing species (e.g. those produced by the presently invented electrochemically induced electrolyte decomposition) that are not normally used as a lithium salt in a conventional lithium-ion battery. As indicated in Table 3 below, these solid state electrolytes also demonstrate outstanding lithium ion conductivity values. Furthermore, As shown in FIG. 4, the lithium ion conductivity values of a polymer mixture containing a conventional solid electrolyte polymer (PEO or PPO) and a sulfonated polymer exhibit unexpected synergistic effect.

Not to be bound by the theory, but the presence of a different polymer and some lithium-containing inorganic species appear to be capable of forming more amorphous phase in an otherwise crystalline polymer and enabling faster or easier transport of lithium ions through these amorphous zones.

TABLE 2

Lithium ion conductivity of various solid state electrolyte compositions.

| Sample No. | Lithium-containing inorganic species (Li salt) | Lithium-conducting polymer (sulfonated polymer) | Li-ion conductivity (S/cm) |
|---|---|---|---|
| C1 | $LiClO_4$ | S-PTFE (20-80%) | $6.9 \times 10^{-5}$ to $1.1 \times 10^{-3}$ S/cm |
| C2 | $LiClO_4$ | S-PEEK | $8.8 \times 10^{-5}$ to $2.1 \times 10^{-3}$ S/cm |
| C2-b | $LiClO_4/NaClO_4$ (1/1 ratio) | S-PEEK | $1.6 \times 10^{-4}$ to $4.1 \times 10^{-3}$ S/cm |
| C3 | $LiClO_4$ | S-PSf | $7.4 \times 10^{-5}$ to $8.1 \times 10^{-4}$ S/cm |
| C4 | $LiClO_4$ | S-PPy | $7.5 \times 10^{-5}$ to $5.5 \times 10^{-4}$ S/cm |
| C5 | $LiPF_6$ | S-PEEK | $2.4 \times 10^{-4}$ to $1.9 \times 10^{-3}$ S/cm |
| C5-b | $LiPF_6/NaPF_6$ (0.3/0.7 ratio) | S-PEEK | $5.2 \times 10^{-4}$ to $3.5 \times 10^{-3}$ S/cm |
| C6 | $LiBF_4$ | S-PEEK | $2.6 \times 10^{-4}$ to $1.5 \times 10^{-3}$ S/cm |
| C7 | $LiBF_4 + LiCF_3SO_3$ | S-PSf | $9.4 \times 10^{-5}$ to $9.3 \times 10^{-4}$ S/cm |
| C8 | $LiBOB + LiNO_3$ | S-PSf | $8.6 \times 10^{-5}$ to $7.4 \times 10^{-4}$ S/cm |

TABLE 3

Lithium ion conductivity of various solid state electrolyte compositions.

| Sample No. | Lithium-containing inorganic species | Lithium-conducting polymer (non-sulfonated polymer) | Li-ion conductivity (S/cm) |
|---|---|---|---|
| D1 | $Li_2CO_3 + (CH_2OCO_2Li)_2$ | PEO (15-85% by wt.) | $1.4 \times 10^{-4}$ to $8.7 \times 10^{-4}$ S/cm |
| D2 | $LiF + LiOH + Li_2C_2O_4$ | PEO (5-95% by wt.) | $2.7 \times 10^{-4}$ to $9.3 \times 10^{-4}$ S/cm |
| D3 | LiF + HCOLi | PEO | $2.7 \times 10^{-4}$ to $9.3 \times 10^{-4}$ S/cm |
| D4 | $Li_2CO_3$ | PAN | $8.4 \times 10^{-5}$ to $6.9 \times 10^{-4}$ S/cm |
| D5 | $LiOH + Li_2CO_3$ | PPO | $8.7 \times 10^{-5}$ to $6.6 \times 10^{-4}$ S/cm |
| D6 | $LiOH + Li_2CO_3$ | PEO + S-PANi | $5.5 \times 10^{-4}$ to $2.9 \times 10^{-3}$ S/cm |
| D7 | $LiOH + Li_2CO_3$ (30% salt) | PEO + S-PEEK (PEO-S-PEEK ratio varied) | See FIG. 4 |
| D8 | $LiOH + Li_2CO_3$ | PEO + S-PSf | $3.5 \times 10^{-4}$ to $1.5 \times 10^{-3}$ S/cm |
| D9 | $LiOH + Li_2CO_3$ (30% salt) | PPO + S-PTFE (PPO-S-PTFE ratio varied) | See FIG. 4 |

EXAMPLE 10

Preparation of $MoS_2$/RGO Hybrid Cathode Material for Li Metal Cells and $MOS_2$ as a Filler Dispersed in a Carbon Matrix (GO=Graphene Oxide; RGO=Reduced Graphene Oxide)

Ultra-thin $MoS_2$/RGO hybrid was synthesized by a one-step solvothermal reaction of $(NH_4)_2MoS_4$ and hydrazine in an N, N-dimethylformamide (DMF) solution of oxidized graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 ml of $N_2H_4$—$H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried and made into a cathode.

Figure 5:
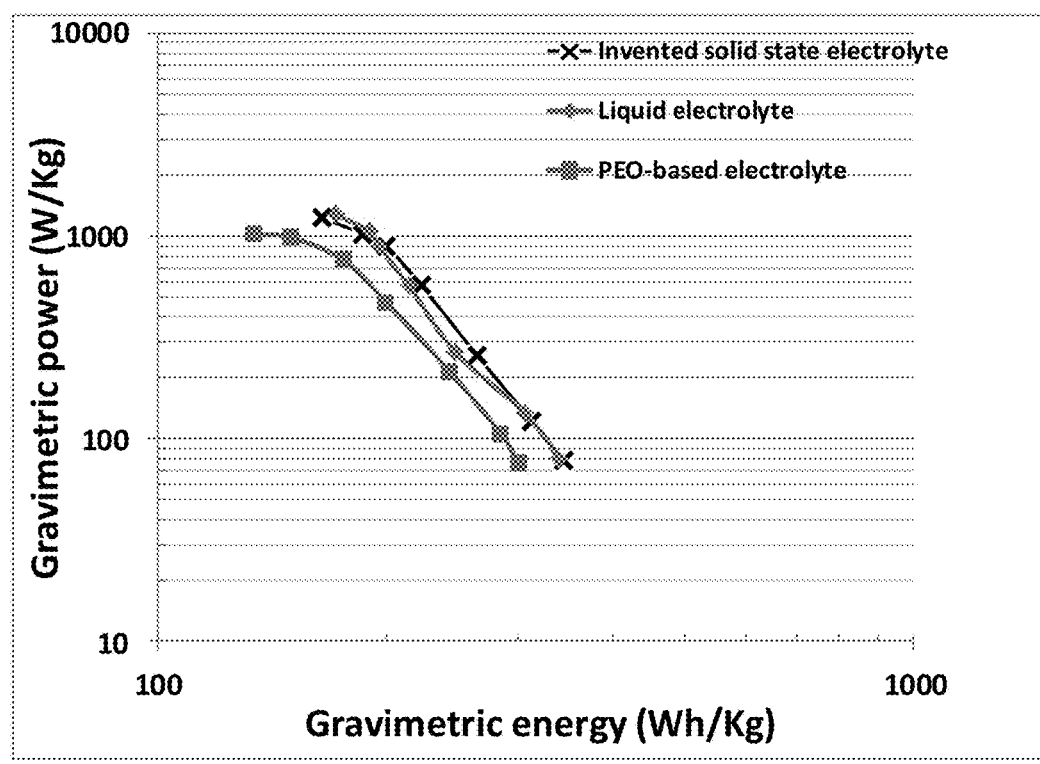
FIG. 5 The Ragone plots (power density vs. energy density) of three cells tested in different discharge rates (different current densities). The 3 different electrolytes in these 3 cells are the presently invented solid electrolyte (C5 in Table 2), liquid electrolyte (1 M of $LiPF_6$ in PC-EC solvent mixture), and a prior art PEO-$LiPF_6$ polymer electrolyte.

Three Li metal cells using this same cathode but three different electrolytes were investigated. These electrolytes include the presently invented solid electrolyte (C5 in Table 2), liquid electrolyte (1 M of $LiPF_6$ in PC-EC solvent mixture), and a prior art PEO-$LiPF_6$ polymer electrolyte. The Ragone plots (power density vs. energy density) of these 3 cells tested in different discharge rates (different current densities) are shown in FIG. 5. These data demonstrate that the Li metal secondary cell featuring the inventive solid-state electrolyte is as good as the cell using a liquid electrolyte, even at a high rate (high power density). This implies that lithium transport in the presently invented solid electrolyte is relatively fast. Further, compared to the liquid electrolyte-based cell that is subject to dendrite formation, flammability, and explosion issues, the battery cell featuring a solid state electrolyte is safe.

In further contrast, the cell based on the prior art PEO polymer electrolyte exhibits both lower energy density and power density, indicating slower lithium ion responses in this electrolyte system, given same battery components.

EXAMPLE 11

Li-Ion Cells Having a Graphite Anode and Lithium Iron Phosphate Cathode

Figure 6:
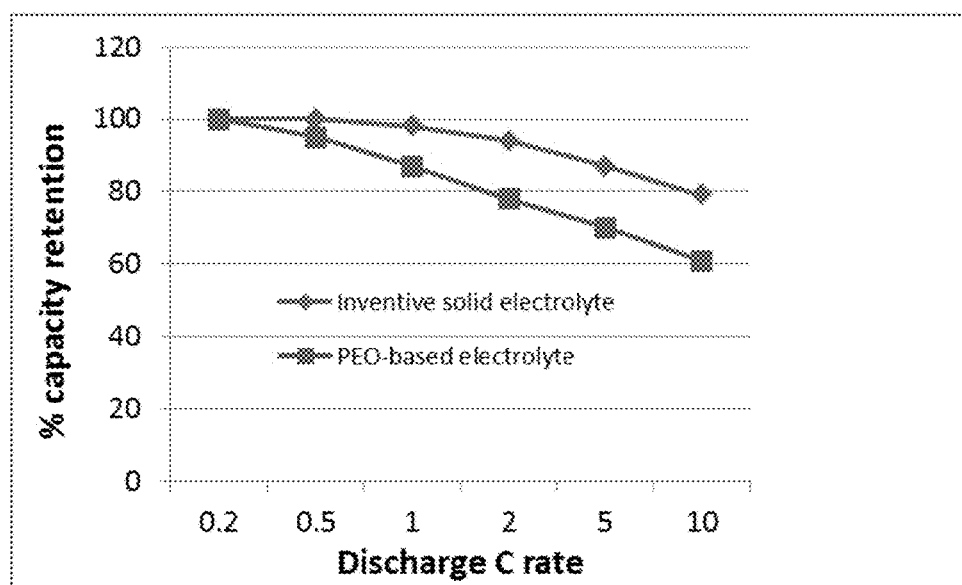
FIG. 6 The capacity retention of 2 lithium-ion cells (one with an inventive solid state electrolyte and the other with a PEO-based solid polymer electrolyte) plotted as a function of discharge C rates.

Two Li-ion secondary cells using an invented solid state electrolyte (B6 in Table 1) and a conventional PEO-based polymer electrolyte were investigated. As shown in FIG. 6, the capacity of the inventive cell performs relatively well even at relatively high C rates (1 C=full discharge in 1 hour; 10C rate=full discharge in 1/10 hours; 0.5C rate=full discharge in 1/0.5=2 hours, etc.). By contrast, PEO based electrolyte does not enable lithium ions to move fast, resulting in lower capacity.

EXAMPLE 12

Preparation of Graphene-Enabled $Li_xV_3O_8$ Nano-Sheets from $V_2O_5$ and LiOH as a Cathode for Li-Ion Cells All chemicals used in this study were analytical grade and were used as received without further purification. $V_2O_5$ (99.6%, Alfa Aesar) and LiOH (99+%, Sigma-Aldrich) were used to prepare the precursor solution. Graphene oxide (GO, 1% w/v obtained in Example 2 above) was used as a structure modifier. First, $V_2O_5$ and LiOH in a stoichiometric V/Li ratio of 1:3 were dissolved in actively stirred de-ionized water at 50° C. until an aqueous solution of $Li_xV_3O_8$ was formed. Then, GO suspension was added while stirring, and the resulting suspension was atomized and dried in an oven at 160° C. to produce the spherical composite particulates of GO/$Li_xV_3O_8$ nano-sheets and the sample was designated NLVO-1. Corresponding $Li_xV_3O_8$ materials were obtained under comparable processing conditions, but without graphene oxide sheets. The sample was designated as LVO-2.

The Nyquist plots obtained from electrical impedance tests show a semicircle in the high to medium frequency range, which describes the charge-transfer resistance for both electrodes. The intercept value is considered to represent the total electrical resistance offered by the electrolyte. The inclined line represents the Warburg impedance at low frequency, which indicates the diffusion of ions in the solid matrix. The values of Rct for the vanadium oxide alone and graphene-enhanced composite electrodes are about 50.0 and 350.0Ω for NLVO-1 and LVO-2, respectively. The Rct of the composite electrode is much smaller than that of the LVO electrode. Therefore, the presence of graphene (<2% by weight in this case) in the vanadium oxide composite has dramatically reduced the internal charge transfer resistance and improved the battery performance upon extended cycling.

An additional set of graphene-enabled $Li_xV_3O_8$ nano-sheet composite particulates was produced from $V_2O_5$ and LiOH under comparable conditions, but was dried under different atomization temperatures, pressures, and gas flow rates to achieve four samples of composite particulates with four different $Li_xV_3O_8$ nano-sheet average thicknesses (4.6 nm, 8.5 nm, 14 nm, and 35 nm). A sample of $Li_xV_3O_8$ sheets/rods with an average thickness/diameter of 76 nm was also obtained without the presence of graphene oxide sheets (but, with the presence of carbon black particles) under the same processing conditions for the graphene-enhanced particulates with a nano-sheet average thickness of 35 nm. It seems that carbon black is not as good a nucleating agent as graphene for the formation of $LiN_3O_8$ nano-sheet crystals. The specific capacity of these cathode materials was investigated using Li foil or a layer of natural graphite particles as an anode for a lithium metal rechargeable battery or lithium-ion battery, respectively. For comparison purposes, both a presently invented solid state electrolyte and a conventional liquid electrolyte were incorporated as the electrolyte for these cells. The electrochemical testing results also indicate that both electrolytes lead to comparable energy densities at very high discharge rates, but the solid state electrolyte leads to better energy densities at low rates. This observation is surprising since lithium ions are normally considered to move faster in a liquid electrolyte than in a solid electrolyte, which is presumably more conducive to efficient use of the electrode active material. Most significantly, there is no dendrite issue in solid electrolyte based cells even when the batteries were charged and discharged in a fast rate and no fire/flame when the cells were overcharged.

EXAMPLE 13

Electrochemical Deposition of S on Various Webs or Paper as a Cathode Active Material for Li—S Batteries The electrochemical deposition of sulfur (S) was conducted before the cathode active layer was incorporated into a lithium-sulfur battery cell (Li—S). The anode, the electrolyte, and the integral layer of porous graphene structure (serving as a cathode layer) are positioned in an external container outside of a lithium-sulfur cell. The needed apparatus is similar to an electro-plating system, which is well-known in the art.

In a typical procedure, a metal polysulfide ($Li_2S_9$ and $Nai_2S_6$) is dissolved in a solvent (e.g. mixture of DOL/DME at a volume ratio from 1:3 to 3:1) to form an electrolyte solution. The electrolyte solution is then poured into a chamber or reactor under a dry and controlled atmosphere condition (e.g. He or Nitrogen gas). A metal foil was used as the anode and a layer of the porous graphene structure as the cathode; both being immersed in the electrolyte solution. This configuration constitutes an electrochemical deposition system. The step of electrochemically depositing nano-scaled sulfur particles or coating on the graphene surfaces was conducted at a current density preferably in the range of 1 mA/g to 10 A/g, based on the layer weight of the porous graphene structure.

The chemical reactions that occurred in this reactor may be represented by the following equation: $M_xS_y \rightarrow M_xS_{y-z}+zS$ (typically z=1-4). Quite surprisingly, the precipitated S is preferentially nucleated and grown on massive graphene surfaces to form nano-scaled coating or nano particles. The coating thickness or particle diameter and the amount of S coating/particles was controlled by the specific surface area, electro-chemical reaction current density, temperature and time. In general, a lower current density and lower reaction temperature lead to a more uniform distribution of S and the reactions are easier to control. A longer reaction time leads to a larger amount of S deposited on graphene surfaces and the reaction is ceased when the sulfur source is consumed or when a desired amount of S is deposited.

Figure 7:
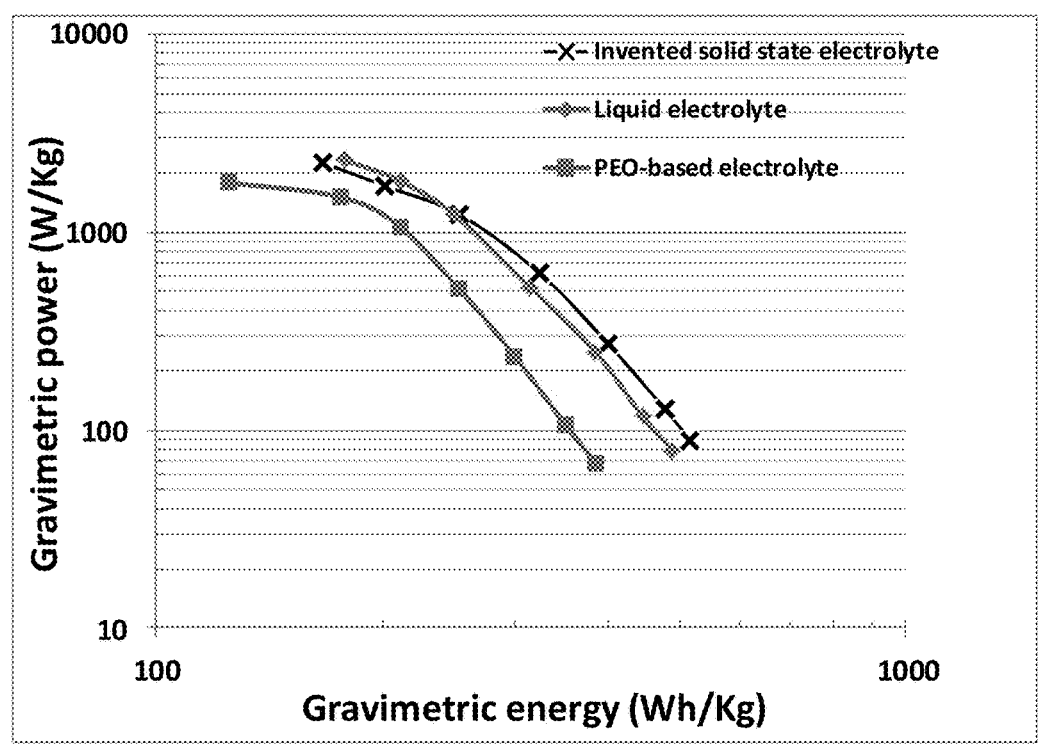
FIG. 7 The Ragone plots (power density vs. energy density) of three Li—S cells: first one with the inventive solid state electrolyte, second with liquid electrolyte, and third with conventional polymer solid electrolyte.
Figure 8:
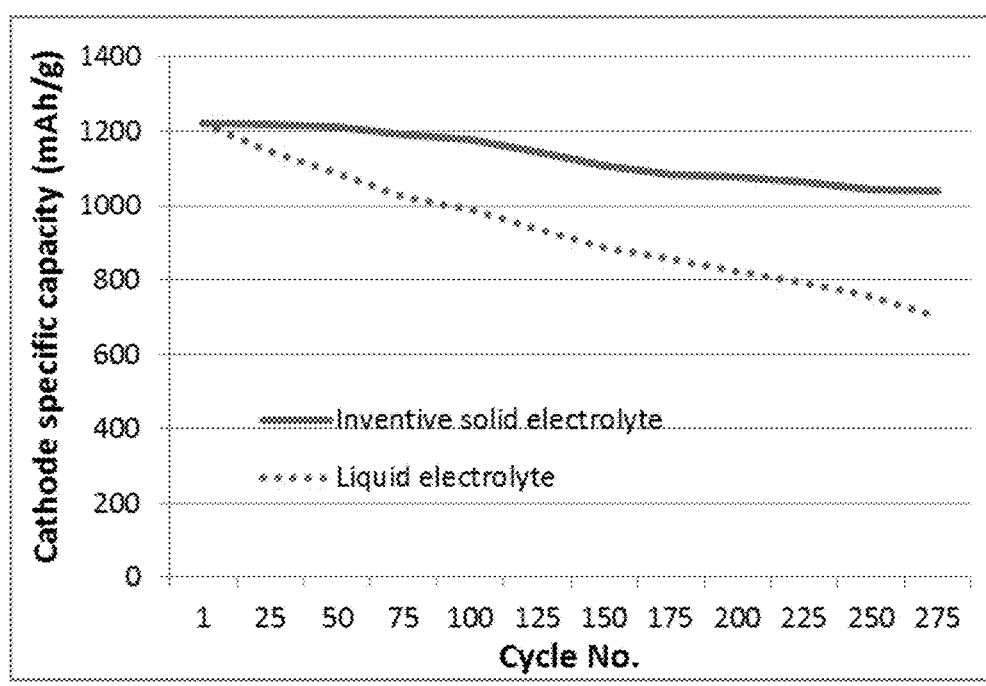
FIG. 8 The specific discharge capacities of two Li—S cells, one containing the presently invented solid state electrolyte and the other liquid electrolyte, are plotted as a function of the number of charge/discharge cycles.

The specific discharge capacities of two Li—S cells (one containing the presently invented solid state electrolyte and one containing prior art liquid electrolyte) were plotted as a function of the number of cycles (FIG. 8). The Ragone plots of the two cells, plus one cell containing a conventional PEO-based polymer solid electrolyte, are shown in FIG. 7. Quite unexpectedly, the cells containing the presently invented solid state electrolyte actually show the highest energy densities among the three ells, and a more stable cycling behavior even though all three cells have otherwise identical configurations. It appears that the invented solid state electrolyte not only serves to stop dendrite penetration, but also prevent sulfur and lithium polysulfide species from being dissolved in the liquid electrolyte and migrated from the cathode toward the anode side. Such a blocking action prevents the lithium polysulfide from reaching and reacting with the Li metal at the anode, which otherwise would form $Li_2S$ that irreversibly deposits on Li metal surface. This so-called shuttling effect in all Li—S cells is actually eliminated due to the presence of this solid state electrolyte. This is an un-intended, but highly beneficial result.

We have achieved a specific energy >500 Wh/kg in many Li—S cells (some even >600 wh/kg) and none of these cells have any dendrite issue.

EXAMPLE 14

Li-Air Cells with Ionic Liquid Electrolytes

To test the performance of the Li-air batteries employing a solid state electrolyte and those with a liquid electrolyte, several pouch cells with dimension of 5 cm×5 cm were built. Porous carbon electrodes were prepared by first preparing ink slurries by dissolving a 90 wt. % EC600JD Ketjen black (AkzoNobel) and 5 wt. % Kynar PVDF (Arkema Corporation) in Nmethyl-2-pyrrolidone (NMP). Air electrodes were prepared with a carbon loading of approximately 20.0 mg/cm$^2$ by hand-painting the inks onto a carbon cloth (PANEX 35, Zoltek Corporation), which was then dried at 180° C. overnight. The total geometric area of the electrodes was 3.93 cm$^2$. The $Li/O_2$ test pouch cells were assembled in an argon-filled glove box. Each cell consists of metallic lithium anode and the air electrode as a cathode, prepared as mentioned above. A copper current collector for the anode and an aluminum current collector for the cathode were used. In one $Li/O_2$ cell, a layer of LiTFSI/S-PEEK solid state electrolyte was implemented between the anode layer (Li foil) and the cathode layer. The cathode was soaked in the oxygen saturated EMITFSI-DOL/LiTFSI solution for 24 hours and was placed under vacuum for an hour before being included in the cell assembly. For comparison, a Celgard 3401 separator separating the two electrodes was soaked in 1 M LiTFSI-DOL/EMITFSI (6/4) solutions for a minimum of 24 hours.

The cells were placed in an oxygen-filled glove box where oxygen pressure was maintained at 1 atm. Cell charge-discharge was carried out with a battery cycler at the current rate of 0.1 mA/cm$^2$ at room temperature. It was found surprisingly that a Li-air featuring the solid state electrolyte exhibits a higher round-trip efficiency for cells (75%) as compared with their counterparts with a liquid electrolyte (64%). Most significantly, the cells containing liquid electrolyte tended to fail in 25-35 charge-discharge cycles. In contrast, the presently invented cells containing a solid state electrolyte usually lasted for more than 100 cycles without experiencing any dendrite-induced failure.

EXAMPLES 15

Figure 9:
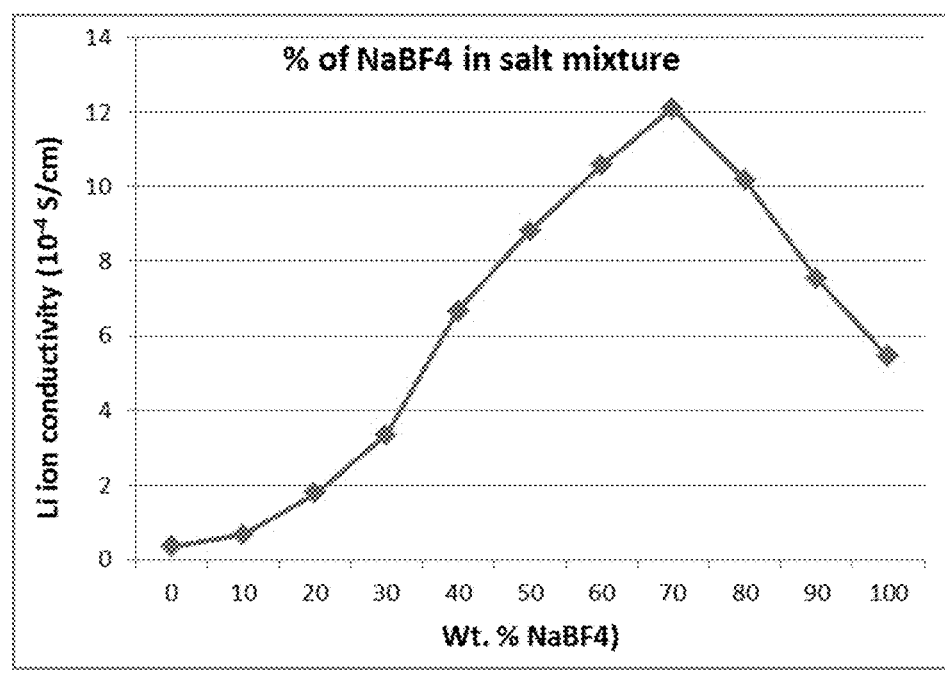
FIG. 9 Lithium ion conductivity in a full range of mixtures of $NaBF_4$ and $LiBF_4$ (dispersed in S-PEEK) plotted as a function of the weight % of $NaBF_4$ in the salt mixture (each sample having 50% by wt. of salt mixture and 50% sulfonated PEEK).

Lithium Ion Conductivity of Composites Containing NaBF$_4$ and LiBF$_4$ Salts Dispersed in S-PEEK Summarized in FIG. 9 are lithium ion conductivity values of a full range of mixtures of NaBF$_4$ and LiBF$_4$ (dispersed in S-PEEK), which are plotted as a function of the weight % of NaBF$_4$ in the salt mixture (each sample having 50% by wt. of salt mixture and 50% sulfonated PEEK). These results indicate an unexpected synergistic effect. Even though the highest lithium-ion conductivity values in the composites of NaBF$_4$ and LiBF$_4$ salts, separately dispersed in S-PEEK, are $5.45 \times 10^{-4}$ S/cm and $0.35 \times 10^{-4}$ S/cm, respectively, the mixtures can exhibit a lithium-ion conductivity as high as $12.1 \times 10^{-4}$ S/cm. These lithium-ion conductivity values are already in the range of values for liquid electrolytes. They result in exceptional high rate capability that cannot be achieved by prior art solid state electrolytes.

EXAMPLES 16

Evaluation of Electrochemical Performance of Various Li Secondary Batteries

A broad array of Li metal secondary (rechargeable) batteries was investigated. None of the batteries containing a solid state electrolyte prepared according to instant invention were found to fail due to dendrite penetration through the separator layer, as usually observed with lithium metal batteries containing liquid electrolyte, based on the observation of post-testing inspection on a large number of battery cells.

Li ion storage capacities of many cells were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM). The presently invented dendrite-intercepting layer enables the safe operation of many lithium metal and sodium metal secondary batteries capable of storing an energy density of 300-400 Wh/kg (e.g. lithium metal-metal oxide cells), 400-750 Wh/kg (e.g. Li—S cells), and >1,000 Wh/kg (e.g. Li-air cells) for a long cycle life without a dendrite penetration problem.

In summary, the present invention provides an innovative, versatile, and surprisingly effective platform materials technology that enables the design and manufacture of superior and safe lithium metal rechargeable batteries that feature a hybrid solid state electrolyte having a high lithium transport rate. The lithium dendrite issue in these high energy and high power cells is essentially eliminated, making it possible for these batteries to be widely implemented for electric vehicle, renewable energy storage, and electronic device applications.

The invention claimed is:

1. A solid state electrolyte composition for a rechargeable lithium battery, said electrolyte composition comprising a mixture of a lithium ion-conducting polymer matrix or binder, a lithium ion-conducting inorganic species or lithium salt, and a sodium ion-conducting species or sodium salt, wherein said lithium ion-conducting inorganic species or lithium salt and said sodium ion-conducting species or sodium salt are dispersed in or chemically bonded by said polymer matrix or binder, wherein said lithium ion-conducting inorganic species or lithium salt is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof; said sodium-conducting species or sodium salt is selected from $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, $NaAsF_6$, $NaCF_3SO_3$, $NaN(CF_3SO_2)_2$, sodium bis(oxalato)borate (NaBOB), $NaBF_2C_2O_4$, $NaBF_2C_2O_4$, $NaNO_3$, $NaPF_3(CF_2CF_3)_3$, sodium bisperfluoro-ethysulfonylimide (NaBETI), sodium bis(trifluoromethanesulfonyl)imide, sodium bis(fluorosulfonyl)imide, sodium trifluoromethanesulfonimide (NaTF SI), or a combination thereof, wherein X =F, Cl, I, or Br, R=a hydrocarbon group, $0<x \leq 1$, $1 \leq y \leq 4$; and wherein the polymer matrix or binder is in an amount from 1% to 99% by weight of the electrolyte composition and a weight ratio between said lithium ion-conducting inorganic species or lithium salt and said sodium ion-conducting species or sodium salt is from 1/99 to 99/1.

2. The solid state electrolyte composition of claim 1, wherein said polymer matrix or binder comprises a sulfonated polymer, a mixture of a sulfonated polymer and an electron-conducting polymer, a mixture of a sulfonated polymer and an electronically non-conducting polymer, or a mixture of an electron-conducting polymer and a lithium ion-conducting polymer.

3. The solid state electrolyte composition of claim 2, wherein said sulfonated polymer is selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

4. The solid state electrolyte composition of claim 1, wherein said polymer matrix or binder is selected from sulfonated polyaniline, sulfonated polypyrrole, sulfonated polythiophene, sulfonated polyfuran, or a combination thereof.

5. The solid state electrolyte composition of claim 1, wherein said polymer matrix or binder comprises a mixture of an electron-conducting polymer and a lithium ion-conducting polymer; said lithium ion-conducting polymer is selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof, wherein the electron-conducting polymer-to-lithium ion-conducting polymer weight ratio is from 1/99 to 99/1.

6. The solid state electrolyte composition of claim 1, wherein said polymer matrix or binder comprises a mixture of a lithium ion-conducting polymer and an electron-conducting polymer and wherein said electron-conducting polymer is selected from the group consisting of polyaniline, polypyrrole, polythiophene, polyfuran, bi-cyclic polymers, derivatives thereof, and combinations thereof.

7. The solid state electrolyte composition of claim 1, wherein said polymer matrix or binder contains a lithium ion-conducting polymer selected from poly(ethylene oxide) (PEO), [P]polypropylene oxide (PPO), poly(acrylonitrile) (PAN), poly(methyl methacrylate)(PMMA), poly(vinylidene fluoride)(PVDF), [P]poly bis-methoxy ethoxyethoxide-phosphazene, [P]polyvinyl chloride, [P]polydimethylsiloxane, and poly(vinylidene fluoride)-hexafluoropropylene (PVDF-HFP), a derivative thereof, or a combination thereof, or a mixture thereof with a sulfonated polymer.

8. A solid state electrolyte composition for a rechargeable lithium battery, said electrolyte composition comprising a mixture of a lithium ion-conducting polymer matrix or binder, a lithium ion-conducting inorganic species or lithium salt, and a sodium ion-conducting species or sodium salt, wherein said lithium ion-conducting inorganic species or lithium salt and said sodium ion-conducting species or sodium salt are dispersed in or chemically bonded by said polymer matrix or binder, wherein said lithium ion-conducting inorganic species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$; and wherein the polymer matrix or binder is in an amount from 1% to 99% by weight of the electrolyte composition and a weight ratio between said lithium ion-conducting inorganic species or lithium salt and said sodium ion-conducting species or sodium salt is from 1/99 to 99/1, wherein said polymer matrix further comprises particles of a filler dispersed therein.

9. The solid state electrolyte composition of claim 8, wherein said filler is selected from a metal oxide, metal carbide, metal nitride, metal boride, metal dichalcogenide, or a combination thereof.

10. The solid state electrolyte composition of claim 8, wherein said filler is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

11. The solid state electrolyte composition of claim 8, wherein said filler is selected from nano discs, nano platelets, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein said discs, platelets, or sheets have a thickness less than 100 nm.

12. The solid state electrolyte composition of claim 1, wherein said lithium ion-conducting species has a room temperature ion conductivity no less than $10^{-4}$ S/cm.

13. The solid state electrolyte composition of claim 1, wherein said lithium ion-conducting species has a room temperature ion conductivity no less than $10^{-3}$ S/cm.

14. A lithium secondary battery containing an anode, a cathode, and the solid state electrolyte of claim 1.

15. The lithium secondary battery of claim 14, which is a lithium-ion battery, a rechargeable lithium metal battery, a lithium-sulfur battery, a lithium-selenium battery, or a lithium-air battery.

16. A process for producing the solid state electrolyte composition of claim 1, said process comprising (a) preparing a working electrode containing a lithium ion-conducting polymer; (b) preparing a counter electrode containing lithium metal or alloy and sodium metal or alloy; (c) bringing said working electrode and said counter electrode in contact with an electrolyte containing a solvent and a lithium salt and/or a sodium salt dissolved in said solvent; and (d) applying a current or voltage to said working electrode and said counter electrode to induce an electrochemical oxidative decomposition and/or a reductive decomposition of said electrolyte and/or said salt for forming said lithium ion-conducting inorganic species or lithium salt and/or said sodium ion-conducting inorganic species or sodium salt that are attached or bonded to said lithium ion-conducting polymer for forming said solid state electrolyte composition.

17. The process of claim 16, which is a roll-to-roll process that includes preparing said working electrode in a roll form supported by a feeder roller, and said step of bringing said working electrode and said counter electrode in contact with said electrolyte contains unwinding said working electrode from said feeder roller, and feeding said working electrode into said electrolyte.

18. The process of claim 16, wherein said lithium ion-conducting polymer contains a sulfonated polymer or a mixture of a sulfonated polymer and a polymer selected from poly(ethylene oxide)(PEO), [P]polypropylene oxide (PPO), poly(acrylonitrile)(PAN), poly(methyl methacrylate) (PMMA), poly(vinylidene fluoride) (PVDF), [P]poly bis-methoxy ethoxyethoxide-phosphazene, [P]polyvinyl chloride, [P]polydimethylsiloxane, and poly(vinylidene fluoride)-hexafluoropropylene (PVDF-HFP), a derivative thereof, or a combination thereof.

19. The process of claim 16, wherein said lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), [L]li-[F]fluoroalkyl-[P]phosphate ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

20. The process of claim 16, wherein said solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof.

21. A process for producing the solid state electrolyte composition of claim 1, said process comprising (a) preparing a working electrode containing a carbon material selected from an amorphous carbon, polymeric carbon, activated carbon, carbon black, graphite particles, graphene sheets, carbon nanotubes, carbon fibers, graphite fibers, carbon nano-fibers, or a combination thereof; (b) preparing a counter electrode containing lithium metal or alloy and sodium metal or alloy; (c) bringing said working electrode and said counter electrode in contact with an electrolyte containing a solvent and a lithium salt or sodium salt dissolved in said solvent; (d) applying a current or voltage to said working electrode and said counter electrode to induce an electrochemical oxidative decomposition and/or a reductive decomposition of said electrolyte and/or said salt for forming said lithium ion-conducting inorganic species or lithium salt and said sodium ion-conducting inorganic species or sodium salt that are attached to said carbon material; and (e) mixing said lithium ion-conducting inorganic species or lithium salt and said sodium ion-conducting inorganic species or sodium salt, with or without said carbon material, with a lithium ion-conducting polymer for forming said solid state electrolyte composition.

22. A process for producing the solid state electrolyte composition of claim 1, said process comprising (a) preparing a working electrode containing a lithium ion-conducting polymer; (b) preparing a counter electrode containing lithium metal or alloy and sodium metal or alloy; (c) bringing said working electrode and said counter electrode in physical contact with each other and in contact with an electrolyte containing a solvent and a lithium salt and sodium salt dissolved in said solvent; wherein said working electrode and said counter electrode are brought to be at the same electrochemical potential level, inducing a chemical reaction between said lithium or sodium metal or alloy and said lithium ion-conducting polymer and inducing electrochemical decomposition of said electrolyte for forming said lithium ion-conducting inorganic species or lithium salt and said sodium ion-conducting inorganic species or sodium salt that are attached or chemically bonded to said lithium ion-conducting polymer to form said solid state electrolyte composition.

23. The process of claim 22, which is conducted in a roll-to-roll manner.

24. The process of claim 22, wherein said lithium ion-conducting polymer contains a sulfonated polymer or a mixture of a sulfonated polymer and a polymer selected from poly(ethylene oxide)(PEO), [P]polypropylene oxide (PPO), poly(acrylonitrile)(PAN), poly(methyl methacrylate) (PMMA), poly(vinylidene fluoride) (PVDF), [P]poly bis-methoxy ethoxyethoxide-phosphazene, [P]polyvinyl chloride, [P]polydimethylsiloxane, and poly(vinylidene fluoride)-hexafluoropropylene (PVDF-HFP), a derivative thereof, or a combination thereof.

25. A process for producing the solid state electrolyte composition of claim 1, said process comprising (a) preparing a working electrode containing a carbon material selected from an amorphous carbon, polymeric carbon, activated carbon, carbon black, graphite particles, graphene sheets, carbon nanotubes, carbon fibers, graphite fibers, carbon nano-fibers, or a combination thereof; (b) preparing a counter electrode containing lithium or sodium metal or alloy; (c) bringing said working electrode and said counter electrode in physical contact with each other and in contact with an electrolyte containing a solvent and a lithium salt or sodium salt dissolved in said solvent; wherein said working electrode and said counter electrode are brought to be at the same electrochemical potential level, inducing a chemical reaction between said lithium or sodium metal or alloy and said carbon material and inducing electrochemical decomposition of said electrolyte for forming lithium ion-conducting inorganic species or lithium salt and said sodium ion-conducting inorganic species or sodium salt on surfaces of said carbon material; and (d) mixing said lithium ion-conducting inorganic species or lithium salt and said sodium ion-conducting inorganic species or sodium salt, with or without said carbon material, with a lithium ion-conducting polymer for forming said solid state electrolyte composition.

26. A process for producing the solid state electrolyte composition of claim 1, said process includes an operation of solution mixing, melt mixing, in situ precipitation of sodium-conducting and lithium-conducting inorganic species in a lithium ion-conducting polymer, physical or chemical vapor deposition, electrochemical deposition of said inorganic species on surfaces of a carbon material, electrochemical deposition of said inorganic species on surfaces of a lithium ion-conducting material, or a combination thereof.

27. A solid state electrolyte composition for a rechargeable lithium battery, said electrolyte composition comprising (A) a lithium ion-conducting polymer matrix or binder selected from a sulfonated polymer, (B) a lithium ion-conducting inorganic species or lithium salt, and (C) a sodium ion-conducting species or sodium salt, wherein said lithium ion-conducting inorganic species or lithium salt and said sodium ion-conducting species or sodium salt are dispersed in or chemically bonded by said polymer matrix or binder, wherein said lithium ion-conducting inorganic species or lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), [L]li-[F]fluoroalkyl-[P]phosphate ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof, and wherein the polymer matrix or binder is in an amount from 1% to 99% by weight of the electrolyte composition and a weight ratio between said lithium ion-conducting inorganic species or lithium salt and said sodium ion-conducting species or sodium salt is from 1/99 to 99/1.

28. The solid state electrolyte composition of claim 27, wherein said sodium ion-conducting species or sodium salt is selected from $Na_2CO_3$, $Na_2O$, $Na_2C_2O_4$, NaOH, NaX, $ROCO_2Na$, $HCONa$, $RONa$, $(ROCO_2Na)_2$, $(CH_2OCO_2Na)_2$, $Na_2S$, $Na_xSO_y$, $NaClO_4$, $NaPF_6$, $NaBF_4$, $NaAsF_6$, $NaCF_3SO_3$, $NaN(CF_3SO_2)_2$, sodium bis(oxalato)borate (NaBOB), $NaBF_2C_2O_4$, $NaBF_2C_2O_4$, $NaNO_3$, $NaPF_3(CF_2CF_3)_3$, sodium bisperfluoro-ethysulfonylimide (NaBETI), sodium bis(trifluoromethanesulfonyl)imide, sodium bis(fluorosulfonyl)imide, sodium trifluoromethanesulfonimide (NaTFSI), an ionic liquid-based sodium salt, or a combination thereof; wherein X=F, Cl, I, or Br, R=a hydrocarbon group, $0<x\leq1$, $1\leq y\leq4$.

29. The solid state electrolyte composition of claim 27, wherein said sulfonated polymer is selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

30. A lithium secondary battery containing an anode, a cathode, and the solid state electrolyte of claim 27.

31. The lithium secondary battery of claim 30, which is a lithium-ion battery, a rechargeable lithium metal battery, a lithium-sulfur battery, a lithium-selenium battery, or a lithium-air battery.

* * * * *

UNITED STATES PATENT AND TRADEMARK OFFICE
CERTIFICATE OF CORRECTION

PATENT NO. : 10,084,220 B2  
APPLICATION NO. : 15/375508  
DATED : September 25, 2018  
INVENTOR(S) : Aruna Zhamu et al.

It is certified that error appears in the above-identified patent and that said Letters Patent is hereby corrected as shown below:

Abstract – Line 12 – "x = 0-1, y = 1-4" should read: "$0 < x \leq 1, 1 \leq y \leq 4$"

Claim 7 – Line 25 – "[P]polypropylene" should read: "polypropylene"
  Line 27 – "[P]poly" should read: "poly"
  Line 28 – "[P]polyvinyl" should read: "polyvinyl"
  Line 29 – "[P]polydimethylsiloxane" should read: "polydimethylsiloxane"

Claim 18 – Line 46 – "[P]polypropylene" should read: "polypropylene"
  Line 48 – "[P]poly" should read: "poly"
  Line 49 – "[P]polyvinyl" should read: "polyvinyl"
  Line 50 – "[P]polydimethylsiloxane" should read: "polydimethylsiloxane"

Claim 19 – Line 59 – "lithium oxalyldifluoroborate ($LiBF_2C_2O_4$)" should be deleted
  Line 61 – "[L]li-[F]fluoroalkyl-[P]phosphate" should read: "Li-fluoroalkyl-phosphate"

Claim 26 – Line 27 – "in situ" should read: "*in situ*"

Claim 27 – Line 47 – "metasulfonate" should read: "methanesulfonate"
  Line 50 – "lithium oxalyldifluoroborate ($LiBF_2C_2O_4$)" should be deleted
  Line 51 – "[L]li-[F]fluoroalkyl-[P]phosphate" should read: "Li-fluoroalkyl-phosphate"

Signed and Sealed this  
Twenty-seventh Day of November, 2018

Andrei Iancu  
*Director of the United States Patent and Trademark Office*